(12) United States Patent
Weaver et al.

(10) Patent No.: US 9,894,069 B2
(45) Date of Patent: Feb. 13, 2018

(54) METHOD AND SYSTEM FOR AUTOMATICALLY MANAGING SECRET APPLICATION AND MAINTENANCE

(71) Applicant: Intuit Inc., Mountain View, CA (US)

(72) Inventors: Brett Weaver, San Diego, CA (US); Sabu Kuruvila Philip, Redwood City, CA (US); Troy Otillio, Carlsbad, CA (US); Jinglei Whitehouse, III, Wayland, MA (US); Oleg Gryb, San Francisco, CA (US); Jeffrey M. Wolfe, Parrish, FL (US); Ankur Jain, Redwood City, CA (US); M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 762 days.

(21) Appl. No.: 14/069,921

(22) Filed: Nov. 1, 2013

(65) Prior Publication Data

US 2018/0007048 A1    Jan. 4, 2018

(51) Int. Cl.
*H04L 9/08* (2006.01)
*H04L 29/06* (2006.01)
*G06F 21/10* (2013.01)

(52) U.S. Cl.
CPC .......... *H04L 63/10* (2013.01); *H04L 9/0838* (2013.01); *H04L 63/0457* (2013.01);
(Continued)

(58) Field of Classification Search
CPC ....................................................... H04L 9/08
See application file for complete search history.

(56) References Cited

U.S. PATENT DOCUMENTS

| 5,003,596 A | 3/1991 | Wood |
| 6,157,723 A | 12/2000 | Schultz |

(Continued)

FOREIGN PATENT DOCUMENTS

| EP | 0906677 | 1/1998 |
| EP | 1501256 | 1/2005 |

(Continued)

OTHER PUBLICATIONS

Tokuyoshi, "Encryption: Getting a Grip on Key Rotation", Apr. 23, 2009, pp. 1-3. Retrieved from the internet. <http://www.cio.com/article/2428777/security0/encryption--getting-a-grip-on-key-rotation.html>.

(Continued)

*Primary Examiner* — Kambiz Zand
*Assistant Examiner* — Thanh Le
(74) *Attorney, Agent, or Firm* — Hawley Troxell Ennis & Hawley LLP; Philip McKay

(57) ABSTRACT

Secret application and maintenance policy data is generated for different classes of data. The class of data to be protected is determined and the secret application and maintenance policy data for the determined class of the data to be protected is identified and obtained. Required secrets data representing one or more secrets to be applied to the data to be protected is obtained and then automatically scheduled for application to the data to be protected in accordance with the secret application and maintenance policy data for the determined class of the data to be protected. Maintenance of the one or more secrets is also automatically scheduled in accordance with the secret application and maintenance policy data for the determined class of the data to be protected.

38 Claims, 4 Drawing Sheets

(52) U.S. Cl.
CPC .......... *H04L 63/0815* (2013.01); *G06F 21/10* (2013.01); *H04L 2209/76* (2013.01)

(56) References Cited

U.S. PATENT DOCUMENTS

| | | | |
|---|---|---|---|
| 6,324,648 | B1 | 11/2001 | Grantges, Jr. |
| 6,889,210 | B1 | 5/2005 | Vainstein |
| 6,981,041 | B2 | 12/2005 | Araujo et al. |
| 6,996,716 | B1 | 2/2006 | Hsu |
| 7,178,033 | B1 | 2/2007 | Garcia |
| 7,336,790 | B1 | 2/2008 | Caronni et al. |
| 7,360,075 | B2 | 4/2008 | VanHeyningen et al. |
| 7,380,120 | B1 | 5/2008 | Garcia |
| 7,434,045 | B1 | 10/2008 | Enderwick et al. |
| 7,546,629 | B2 | 6/2009 | Albert et al. |
| 7,568,235 | B2* | 7/2009 | Bird .................... G06F 12/1466 726/27 |
| 7,715,565 | B2 | 5/2010 | Kimmel et al. |
| 7,739,501 | B2 | 6/2010 | Kimmel et al. |
| 7,890,530 | B2* | 2/2011 | Bilger ................. G06F 21/6218 707/781 |
| 7,983,423 | B1 | 7/2011 | Agarwal et al. |
| 7,984,025 | B2* | 7/2011 | Valfridsson ......... G06F 21/6227 707/689 |
| 8,095,960 | B2 | 1/2012 | Boogert et al. |
| 8,316,237 | B1 | 11/2012 | Felsher et al. |
| 8,352,999 | B1 | 1/2013 | Zhan et al. |
| 8,498,941 | B2 | 7/2013 | Felsher |
| 8,560,857 | B2 | 10/2013 | Munetoh et al. |
| 8,656,189 | B2 | 2/2014 | Orsini et al. |
| 8,700,898 | B1* | 4/2014 | Korthny .............. G06F 21/6218 713/165 |
| 8,700,906 | B2 | 4/2014 | Kamara et al. |
| 8,826,013 | B1 | 9/2014 | Kodukula et al. |
| 8,880,882 | B2 | 11/2014 | Kulkarni et al. |
| 2002/0023065 | A1 | 2/2002 | Frelechoux et al. |
| 2004/0210591 | A1 | 10/2004 | Hirschfeld et al. |
| 2005/0138110 | A1 | 6/2005 | Redlich et al. |
| 2006/0062238 | A1 | 3/2006 | Mahendran et al. |
| 2006/0215839 | A1 | 9/2006 | Augenstein et al. |
| 2006/0291664 | A1 | 12/2006 | Suarez et al. |
| 2007/0156781 | A1 | 7/2007 | Kapoor et al. |
| 2007/0195960 | A1 | 8/2007 | Golman et al. |
| 2007/0276931 | A1 | 11/2007 | Mandavi et al. |
| 2008/0013569 | A1 | 1/2008 | Boren |
| 2008/0072309 | A1 | 3/2008 | Kleinsteiber et al. |
| 2008/0083036 | A1 | 4/2008 | Ozzie et al. |
| 2008/0098392 | A1 | 4/2008 | Wipfel et al. |
| 2008/0109491 | A1 | 5/2008 | Gupta |
| 2008/0319909 | A1 | 12/2008 | Perkins et al. |
| 2009/0092252 | A1 | 4/2009 | Noll et al. |
| 2009/0103724 | A1 | 4/2009 | Tamai |
| 2009/0204631 | A1 | 8/2009 | Pomroy et al. |
| 2009/0287837 | A1 | 11/2009 | Felsher |
| 2010/0082991 | A1 | 4/2010 | Baldwin et al. |
| 2010/0146600 | A1* | 6/2010 | Eldar .................. G06F 21/6218 726/5 |
| 2010/0189251 | A1 | 7/2010 | Curren |
| 2011/0004752 | A1 | 1/2011 | Shukla |
| 2011/0022642 | A1 | 1/2011 | deMilo et al. |
| 2011/0022812 | A1 | 1/2011 | van der Linden et al. |
| 2011/0093707 | A1 | 4/2011 | Green et al. |
| 2011/0113236 | A1 | 5/2011 | Chenard et al. |
| 2011/0158406 | A1 | 6/2011 | Marcia et al. |
| 2011/0188651 | A1 | 8/2011 | Iswandhi et al. |
| 2011/0191595 | A1 | 8/2011 | Damian et al. |
| 2011/0219035 | A1 | 9/2011 | Korsunsky et al. |
| 2011/0277027 | A1 | 11/2011 | Hayton et al. |
| 2012/0131189 | A1 | 5/2012 | Smart et al. |
| 2012/0185913 | A1 | 7/2012 | Martinez et al. |
| 2012/0204032 | A1 | 8/2012 | Wilkins et al. |
| 2012/0303776 | A1 | 11/2012 | Ferris |
| 2012/0311564 | A1 | 12/2012 | Khalid |
| 2013/0019284 | A1 | 1/2013 | Pacyga et al. |
| 2013/0060825 | A1 | 3/2013 | Farcasiu et al. |
| 2013/0097706 | A1 | 4/2013 | Titonis et al. |
| 2013/0104213 | A1 | 4/2013 | Nandakumar |
| 2013/0125247 | A1 | 5/2013 | Sprague et al. |
| 2013/0185784 | A1 | 7/2013 | Tamura |
| 2013/0204849 | A1 | 8/2013 | Chacko |
| 2013/0219456 | A1 | 8/2013 | Sharma et al. |
| 2013/0247144 | A1 | 9/2013 | Marshall et al. |
| 2013/0254539 | A1 | 9/2013 | Auradkar et al. |
| 2013/0346558 | A1 | 12/2013 | Khalidi et al. |
| 2014/0007178 | A1 | 1/2014 | Gillum et al. |
| 2014/0007239 | A1 | 1/2014 | Sharpe et al. |
| 2014/0026179 | A1 | 1/2014 | Devarajan et al. |
| 2014/0068732 | A1 | 3/2014 | Hinton et al. |
| 2014/0074637 | A1 | 3/2014 | Hammad |
| 2014/0075499 | A1 | 3/2014 | Arun et al. |
| 2014/0165134 | A1 | 6/2014 | Goldschlag et al. |
| 2014/0244585 | A1 | 8/2014 | Sivasubramanian et al. |
| 2014/0282840 | A1 | 9/2014 | Guinan |
| 2014/0283010 | A1 | 9/2014 | Rutkowski et al. |
| 2014/0330869 | A1 | 11/2014 | Factor et al. |

FOREIGN PATENT DOCUMENTS

| | | |
|---|---|---|
| EP | 2469753 | 6/2012 |
| EP | 2645673 | 10/2013 |
| GB | 2477682 | 11/2009 |
| GB | 2524632 | 1/2015 |
| WO | WO 2010/144735 | 12/2010 |
| WO | WO 2013/144497 | 10/2013 |

OTHER PUBLICATIONS

Cabrera et al., "Method and System for Distributing Secrets," U.S. Appl. No. 14/053,488, filed Oct. 14, 2013.
Cabrera et al., "Method and System for Providing a Secure Secrets Proxy," U.S. Appl. No. 14/054,450, filed Oct. 15, 2013.
Lietz et al., "Method and System for Automatically Managing Secure Communications in Multiple Communications Jurisdiction Zones," U.S. Appl. No. 14/070,168, filed Nov. 1, 2013.
Cabrera et al., "Method and System for Automatically Managing Secrets in Multiple Data Security Jurisdiction Zones," U.S. Appl. No. 14/073,110, filed Nov. 6, 2013.
Lietz et al., "Method and System for Accommodating Communications Channels Using Different Secure Communications Protocols," U.S. Appl. No. 14/215,432, filed Mar. 17, 2014.
Lietz et al., "Method and Apparatus to Rotate Data Encryption Keys in Databases with No Down Time," U.S. Appl. No. 14/263,808, filed Apr. 28, 2014.
Cabrera et al., "Method and Apparatus for Multi-Tenancy Secrets Management," U.S. Appl. No. 14/265,930, filed Apr. 30, 2014.
Reddy et al., "Security Architecture of Cloud Computing," *International Journal of Engineering Science and Technology (IJEST)*, vol. 3, No. 9, Sep. 9, 2011, pp. 7149-7155.
Zao, et al.; "Domain Based Internet Security Policy Management;" DARPA Information Survivability Conference and Exposition, 2000 Proceedings; Jan. 25-27, 2000; IEEE.

* cited by examiner

| DATA CLASSIFICATION DATA 123 | SECRETS APPLICATION AND MAINTENANCE POLICY DATA 124 | REQUIRED SECRETS APPLICATION DATA 127 | SECRETS MAINTENANCE POLICY DATA 129 | |
|---|---|---|---|---|
| DATA CLASSIFICATION 1 | APPLICATION AND MAINTENANCE POLICY 1 | SECRETS DATA 100A, SECRETS DATA 101A | SECRETS MAINTENANCE PROGRAM 1 | 203 |
| DATA CLASSIFICATION 2 | APPLICATION AND MAINTENANCE POLICY 2 | SECRETS DATA 100R | SECRETS MAINTENANCE PROGRAM 2 | 205 |
| DATA CLASSIFICATION 3 | APPLICATION AND MAINTENANCE POLICY 3 | SECRETS DATA 101A | SECRETS MAINTENANCE PROGRAM 3 | 207 |
| DATA CLASSIFICATION 4 | APPLICATION AND MAINTENANCE POLICY 4 | SECRETS DATA 101B | SECRETS MAINTENANCE PROGRAM 4 | 209 |
| ⋮ | ⋮ | ⋮ | | |
| DATA CLASSIFICATION N | APPLICATION AND MAINTENANCE POLICY N | SECRETS DATA 100N, SECRETS DATA 101N | SECRETS MAINTENANCE PROGRAM N | 211 |
| | | 200 | | |

DATA CLASSIFICATION, POLICY, AND REQUIRED SECRETS MAPPING MODULE 125

FIG. 2

METHOD AND SYSTEM FOR AUTOMATICALLY MANAGING SECRET APPLICATION AND MAINTENANCE

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based computing environments, and/or other distributive computing models. This is because many owners and operators of data centers that provide access to data and other resources are extremely hesitant to allow their data and resources to be accessed, processed, and/or otherwise used, by virtual assets, such as virtual machine and server instances in the cloud.

One mechanism historically used to control access to the data and other resources is the use/application of secrets such as, but not limited to, passwords, passphrases, encryption keys, and digital certificates, to control and authenticate entities desiring to access various types of data and resources.

There is little doubt that the use of secrets is an effective method for ensuring that data and other resources are only accessible by an authorized entity. However, the management, selective application, and maintenance of secrets is a complicated and time consuming task that currently is performed in a largely manual manner with significant opportunities for the introduction of error and the risk of malicious actors gaining access to secrets and the data they protect.

For instance, many secrets, such as passwords and encryption keys, must not only be generated and applied according to the type of data they are intended to protect, but the data representing secrets themselves must be also be protected. In addition, in many cases, once the secrets have been deployed and applied to the data to be protected, the secrets must then be re-applied, rotated, or changed, on a periodic basis, with the period between rotation and/or change being dependent on the type of data being protected. That is to say, the policy determining what secrets are selected, and how those secrets are maintained and managed, is dependent on the type of data being protected. This, in and of itself, can be a complicated process when multiple types of data, and multiple types of secrets, from multiple sources, are involved. However, in addition, in many cases, the data is processed in a pipeline manner with one or more secrets being used to protect the data at various stages in the pipeline. Consequently, keeping track of the secrets applied to given data, and where the data protected by those secrets is located at any given time, can be an extremely complicated process. This is particularly true in light of the fact that, as noted, this process is currently performed on a largely manual basis.

For instance, as a specific illustrative example, currently, the application and management of encryption keys typically involves human beings first determining what level of encryption is required for a specific type of data to be protected, e.g., a determination must be made as to the policy with respect to levels of encryption and encryption keys associated with specific types of data. Then, once it is determined what level of encryption needs to be applied to the data in accordance with one or more policies, the encryption keys must be manually obtained and largely manually applied to the data to be protected.

In this specific illustrative example, a human operator must then determine and track when the encryption keys are due to be rotated in accordance with the policy associated with the specific data being protected. Then, new encryption keys must be generated and associated with the old encryption keys which are used to decrypt the data and then re-encrypt the data using the new encryption keys. In one embodiment, once it is determined that all the data protected with the old encryption keys has been re-encrypted with the new encryption keys, then the old encryption keys must be manually retired and the process is complete until the next required rotation of encryption keys in accordance with the policy associated with the specific type of data.

As can be seen from the discussion above, using the current manual methods of managing, applying, and maintaining secrets, even on a single type of data, is a resource intensive process subject to significant human error. In addition, due to the complications associated with managing, applying, and maintaining secrets using current methods, policies associated with secrets are typically rigidly applied in as simplistic a manner as possible in order to reduce the opportunity of introducing human error. Consequently, secrets management policies currently lack the flexibly to adapt to new threats and new situations/environments.

In addition, using the current manual methods of managing, applying, and maintaining secrets, the extensive use of human input, and often multiple human beings, in the management, application, and maintenance of secrets, means that there is significant opportunity for malicious actors to take part in the process. Consequently, the very data intended to be protected by the rather extensive manual secrets management, application, and maintenance methods currently used is placed at risk by the process of protecting the data itself.

In addition, when the secrets to be applied are stored and/or accessed from a computing environment, such as a data center, that is remote and distinct from the computing environment, such as a cloud, where the virtual assets needing the secrets exist, and where the secrets are typically used/applied, there can be significant latencies associated with the management, application, and maintenance, of secrets. Again, this is particularly problematic given that, currently, secrets management, application, and maintenance is largely a manual process.

What is needed is a method and system to manage, apply, and maintain, secrets data in accordance with one or more secrets management policies that are automatically determined based on the specific type of data to be protected, that is highly automated in application, that minimizes latencies, and that can operate in multiple environments, without compromising the secrets, the resources accessed using the secrets, and/or any data or objects associated with the secrets.

SUMMARY

In accordance with one embodiment, a method and system for automatically managing secrets application and maintenance includes generating data classification data defining one or more classes of data. In one embodiment, secret application and maintenance policy data is then generated for each class of data including required secrets application data, indicating the required secret types to be applied to each class of data, and secrets maintenance policy data, indicating secret maintenance procedures for the required secrets applied to each class of data.

In one embodiment, access to data to be protected is obtained and the class of the data to be protected is determined. In one embodiment, the secret application and maintenance policy data for the determined class of the data to be protected is identified and obtained. In one embodiment, the required secrets application data of the secret application and maintenance policy data for the determined class of the data to be protected is analyzed to identify the required secret types to be applied to the data to be protected. In one embodiment, required secrets data representing one or more secrets of the required secret types to be applied to the data to be protected is then obtained.

In one embodiment, the one or more secrets of the required secrets data are then automatically scheduled for application to the data to be protected in accordance with the required secrets application data of the secret application and maintenance policy data for the determined class of the data to be protected.

In one embodiment, maintenance of the one or more secrets of the required secrets data is then automatically scheduled in accordance with the secrets maintenance policy data of the secret application and maintenance policy data for the determined class of the data to be protected.

BRIEF DESCRIPTION OF THE DRAWINGS

FIG. 2 shows one illustrative example of a mapping function provided through, in one embodiment, a data classification, policy, and required secrets mapping module;

Figure 1:
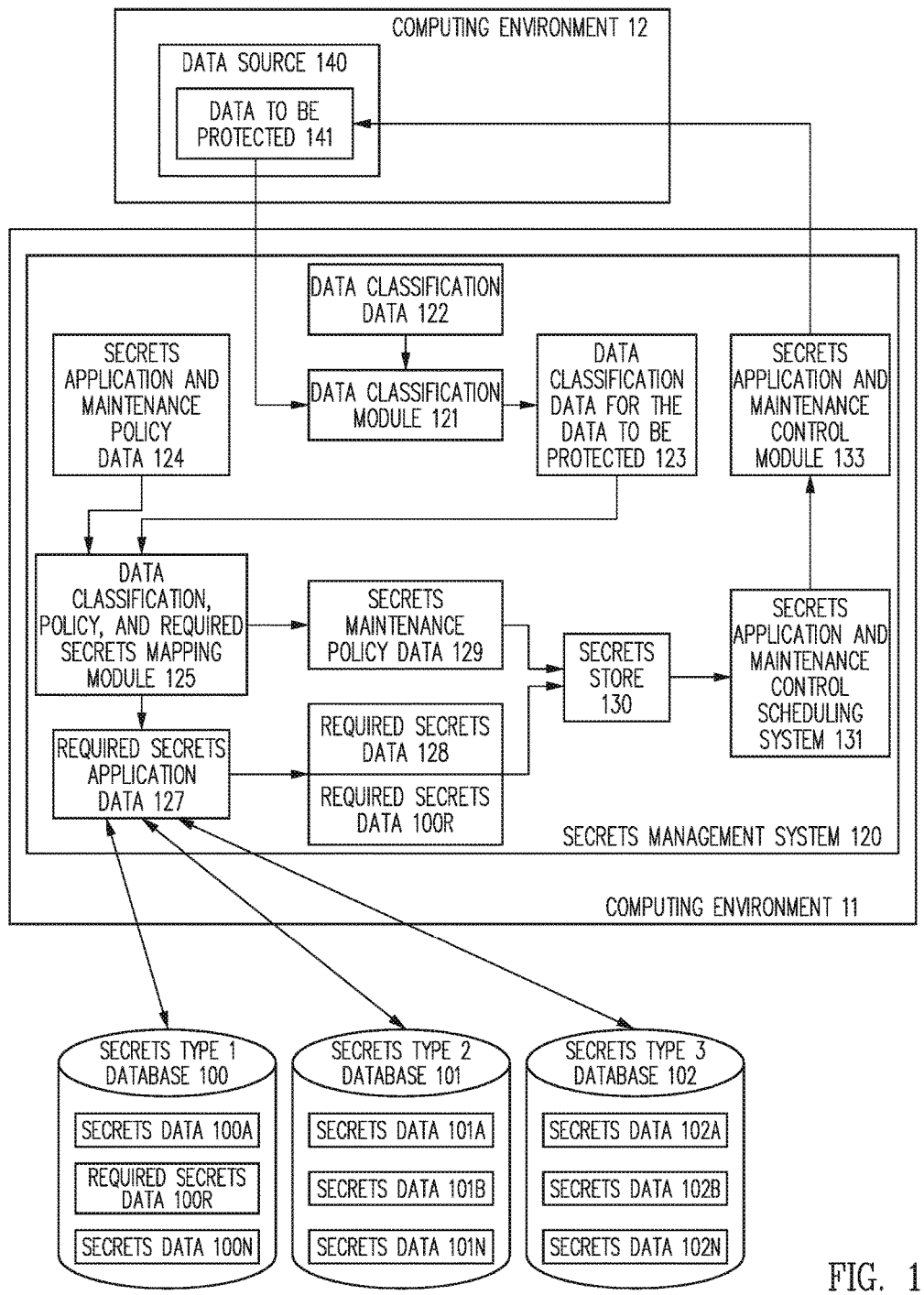
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for automatically managing secrets application and maintenance includes a process for automatically managing secrets application and maintenance implemented, at least in part, by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for automatically managing secrets application and maintenance are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more computing systems, and/or two or more computing environments, are connected by one or more communications channels, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the method and system for automatically managing secrets application and maintenance discussed herein. Of particular note, the various elements in FIG. 1 are shown for illustrative purposes as being associated with specific computing environments, such as computing environment 11 and computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center keeping or accessing the secrets data, a party and/or entity providing all or a portion of a cloud-based computing environment, the owner or a provider of a service, the owner or provider of one or more resources accessible using the secrets, and/or any other party and/or entity providing one or more functions, and/or any other party and/or entity as discussed herein, and/or as known in the art at the time of filing, and/or as made known after the time of filing.

In accordance with one embodiment, data classification data defining one or more classes of data is generated. In various embodiments, the data classification data defines one or more classes of data based on the sensitivity of the data, and/or the perceived need to protect the data.

In one embodiment, the one or more classes of data include, but are not limited to, highly sensitive data, requiring the maximum level of protection; moderately sensitive data, requiring a significant level of protection; sensitive data, requiring some level of protection; non-sensitive data, requiring a minimal level of protection; and/or any other class of data desired and defined, as discussed herein, and/or as known in the art at the time of filing, and/or as made known after the time of filing.

As discussed below, the class of data assigned to the data to be protected determines the secret application and maintenance policy data to be associated with the data to be protected. In one embodiment, the secret application and maintenance policy data associated with data to be protected, in turn, determines the types of secrets that will be used to protect the data to be protected and how the secrets used to protect the data are maintained.

Referring now to FIG. 1, data classification data 122 defining one or more classes of data is shown as input data to data classification module 121 (discussed below).

As noted above, in one embodiment, the class of data associated with data to be protected determines secret application and maintenance policy data to be associated with the data to be protected. To this end, in one embodiment, secret application and maintenance policy data is generated for each defined class of data.

As used herein, the term "secrets" includes any information, credentials, or other devices, necessary to access data, one or more resources, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets represented by the secrets data can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data can be classified according to whether the secrets provide access to internal resources, such as databases and data in a data center, or access to external resources such as services offered through a cloud or the Internet.

In one embodiment, the different types of secrets are provided by, and/or originate from, different secret sources. In one embodiment, the secrets data representing the different classes of secrets are maintained in separate secret databases, systems, or data stores.

As discussed in more detail below, in one embodiment, required secrets data is obtained, and/or maintained by, a secrets manager system that is associated with a data/resources services center, such as a data center, providing data and/or resources to distributed computing systems, such as cloud-based computing environments and resources. Consequently, in one embodiment, the secrets data controlled and/or accessed by secrets manager system includes data representing one or more types of secrets used to control access to one or more types of resources associated with the types of secrets by one or more entities, such as a virtual asset, residing physically or logically outside the data/resources services center where the secrets data is maintained, and/or accessed.

In FIG. 1 the secrets data is represented by secrets data 100A, required secrets data 100R, and secrets data 100N included in secrets type 1 database 100; secrets data 101A, secrets data 101B, and secrets data 101N, included in secrets type 2 database 101; and secrets data 102A, secrets data 102B, and secrets data 102N, included in secrets type 3 database 102. In one embodiment, each of secrets databases 100, 101, and 102 is a source of a different type of secrets that is part of, or accessible by, secrets manager system 120 in computing environment 11.

In FIG. 1, three secrets databases, 100, 101, and 102 are illustratively shown. However, in various embodiments, any number of secrets databases are utilized and/or accessed.

In one embodiment, the class of data to be protected determines the secret application and maintenance policy data to be applied to the data to be protected which, in turn, includes required secrets application data indicating the required secret types to be applied to each class of data.

It follows, that, in one embodiment, a class of data requiring a higher level of security, such as the highly sensitive class of data, dictates secret application and maintenance policy data including required secrets application data requiring a type of secret classified as providing a relatively high level of security, such as a relatively long encryption key.

Likewise, a class of data requiring a moderate level of security, such the moderately sensitive class of data, dictates secret application and maintenance policy data including required secrets application data requiring a type of secret classified as providing a relatively moderate level of security, such as a relatively short encryption key.

Similarly, a class of data requiring a lower level of security, such the non-sensitive class of data, dictates secret application and maintenance policy data including required secrets application data requiring a type of secret classified as providing a relatively low level of security, such as a relatively short password.

Consequently, in one embodiment, each class of data is associated with specific secret application and maintenance policy data including required secrets application data that dictates what type of secrets are to be used to protect data of that class of data.

In addition, the secret application and maintenance policy data for each class of data includes secrets maintenance policy data indicating secret maintenance procedures for the required secrets applied to each class of data.

The timing of the application of secrets of the required secrets type, and the maintenance of the secrets of the required type, e.g., when the secrets are rotated, changed, expire, etc., is also dependent on the class of the data and the level of security required for that class of data. In one embodiment, the application of the secrets of the required secrets type, and the maintenance of the secrets of the required type, e.g., when the secrets are rotated, changed, expire, etc., is determined by the secrets maintenance policy data included in the secret application and maintenance policy data for each class.

It follows, that, in one embodiment, a class of data requiring a higher level of security, such as the highly sensitive class of data, dictates secret application and maintenance policy data including secrets maintenance policy data requiring application of secrets as early in a process as possible, and relatively frequent maintenance of the secrets, e.g., frequent rotation, change out, or expiration of secrets, to provide a relatively high level of security.

Likewise, a class of data requiring a moderate level of security, such the moderately sensitive class of data, dictates secret application and maintenance policy data including secrets maintenance policy data requiring application of secrets relatively early in a process, and relatively moderate maintenance of the secrets, e.g., moderately frequent rotation, change out, or expiration of secrets, to provide a relatively moderate level of security.

Similarly, a class of data requiring a lower level of security, such the non-sensitive class of data, dictates secret application and maintenance policy data including secrets maintenance policy data requiring application of secrets reasonably early in a process, and relatively infrequent maintenance of the secrets, e.g., relatively infrequent rotation, change out, or expiration of secrets, to provide a relatively low level of security.

Consequently, as noted above, the various types of secrets used to protect data of each class of data varies according to the class of data in accordance with the required secrets application data of the secret application and maintenance policy data associated with the data class. Likewise, the application and maintenance of the determined required secrets of the required secrets type varies according to the class of data in accordance with the secrets maintenance policy data of the secret application and maintenance policy data associated with the data class.

In various embodiments, the secret application and maintenance policy data is open-endedly defined such that the secret application and maintenance policy data, and/or required secrets application data, and/or the secrets maintenance policy data, for each class of data can be defined, added to, or otherwise modified, by the one or more parties, such as, but not limited to, the owner of a data center keeping or accessing the secrets data, the owner or provider of a cloud computing environment, the owner or a provider of a service, the owner or provider of one or more resources accessible using the secrets data, and/or any other party legitimately authorized to control the management of secrets. In this way, using the disclosed process for automatically managing secrets application and maintenance, secret application and maintenance policy data is open-endedly defined such that the secret application and maintenance policy data, and/or required secrets application data, and/or the secrets maintenance policy data, for each class of data can be tailored to the specific needs of the one or more parties associated with the management of the secrets.

Referring to FIG. 1, secret application and maintenance policy data 124 is shown as input data to data classification, policy, and required secrets mapping module 125 (discussed below) which identifies/determines required secrets application data 127 for a class of data to be protected and secrets maintenance policy data 129 for a class of data to be protected.

In one embodiment, access to data to be protected is obtained. In various embodiments, the data to be protected is obtained from one of numerous data sources including, but not limited to, one or more software applications, one or more databases, one or more hardware systems, one or more software systems, one or more virtual assets, and/or any other source of data of any type as discussed herein, and/or as known in the art at the time of filing, and/or as becomes available and/or known after the time of filing.

As noted above, in one embodiment, the data to be protected is obtained from a virtual asset data source.

As used herein, the term "virtual asset" includes any virtualized entity or resource, and/or actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

Referring to FIG. 1, data to be protected 141 is shown as being associated with data source 140 in computing system environment 12. In one embodiment, as an illustrative example, data source 140 is a virtual asset, such as a virtual machine instance instantiated in a cloud computing environment represented, in this specific illustrative example by computing environment 12 that is distinct from computing environment 11 of secrets management system 120.

In one embodiment, access to data to be protected is obtained and the class of the data to be protected is determined.

As noted above, in one embodiment, the one or more classes of data include, but are not limited to, highly sensitive data, requiring the maximum level of protection; moderately sensitive data, requiring a significant level of protection; sensitive data, requiring some level of protection; non-sensitive data, requiring a minimal level of protection; and/or any other class of data desired and defined, as discussed herein, and/or as known in the art at the time of filing, and/or as made known after the time of filing.

In various embodiments, the determination as to which data classification is to be applied to the data to be protected, i.e., a determination of the data class of the data to be protected, is made based, at least in part, on one or more data classification factors.

In various embodiments, the one or more data classification factors are factors indicating the relative sensitivity of the data to be protected. For instance, in one embodiment, the data classification factors include, but are not limited to, a determination as to the sensitivity of the data to be protected as determined by the owner of the data to be protected; the sensitivity of the data to be protected as determined by one or more regulations and/or regulatory agencies; the sensitivity of the data to be protected as determined based on the need to protect the identity and personal information of the owners and/or sources of the data to be protected; a determination of the risk or vulnerability associated with the data to be protected; and/or any other determinations as to the sensitivity and or vulnerability of the data to be protected as discussed herein, and/or as known in the art at the time of filing, and/or as becomes known after the time of filing.

In one embodiment, once the determination as to which data classification is to be applied to the data to be protected, i.e., a determination of the data class of the data to be protected, is made, data indicating the determined class of the data to be protected is associated with the data to be protected.

Referring to FIG. 1, data to be protected 141 is analyzed by data classification module 121 which, in turn, generates data classification data for the data to be protected 123. As also seen in FIG. 1, data classification data for the data to be protected 123 is provided as input data to data classification, policy, and required secrets mapping module 125 along with secrets application and maintenance policy data 124.

In one embodiment, once the class of the data to be protected is determined, the secret application and maintenance policy data for the determined class of the data to be protected is identified and obtained.

As noted above, the various types of secrets used to protect data of each class of data varies according to the class of data in accordance with the required secrets application data of the secret application and maintenance policy data associated with the data class. Likewise, maintenance of the determined required secrets of the required secrets type varies according to the class of data in accordance with the secrets maintenance policy data of the secret application and maintenance policy data associated with the data class.

Consequently, the determined class of the data to be protected determines the secret application and maintenance policy data to be applied to the data to be protected which, in turn, determines the required secrets application data to be applied to the data to be protected indicating the required secret types to be applied to the data to be protected. Likewise, the determined class of the data to be protected determines the secret application and maintenance policy data to be applied to the data to be protected which, in turn, determines the secrets maintenance policy data to be applied to the data to be protected indicating secret maintenance procedures for the required secrets applied to the data to be protected.

Referring to FIG. 1, as noted above, data to be protected 141 is analyzed by data classification module 121 which, in turn, generates data classification data for data to be protected 123. As also seen in FIG. 1, data classification data for the data to be protected 123 is provided as input data to data classification, policy, and required secrets mapping module 125 along with secrets application and maintenance policy data 124 which, in turn, identifies/determines required secrets application data 127 and secrets maintenance policy data 129 to be applied to data to be protected 141.

In one embodiment, data classification, policy, and required secrets mapping module 125 includes a mapping function correlating, or associating, the determined class of the data to be protected represented by data classification data for the data to be protected 123, secret application and maintenance policy data 124 to be applied to the data to be protected, including the required secrets application data 127 and secrets maintenance policy data 129 to be applied to data to be protected 141.

FIG. 2 shows one illustrative example of a mapping function 200 provided through, in one embodiment, data classification, policy, and required secrets mapping module 125. As seen in FIG. 2, mapping function 200 includes row 203 indicating that for a data classification 1 indicated in data classification data 123, application and maintenance policy 1 of secrets application and maintenance policy data 124 is to be applied, and required secrets application data 127 requires the application of secrets data 100A and secrets data 101A, in accordance with the secrets maintenance program 1 of secrets maintenance policy data 129.

Likewise, as seen in FIG. 2, mapping function 200 includes row 205 indicating that for a data classification 2 indicated in data classification data 123, application and maintenance policy 2 of secrets application and maintenance policy data 124 is to be applied, and required secrets application data 127 requires the application of required secrets data 100R, in accordance with the secrets maintenance program 2 of secrets maintenance policy data 129.

Likewise, as seen in FIG. 2, mapping function 200 includes row 207 indicating that for a data classification 3 indicated in data classification data 123, application and maintenance policy 3 of secrets application and maintenance policy data 124 is to be applied, and required secrets application data 127 requires the application of secrets data 101A, in accordance with the secrets maintenance program 3 of secrets maintenance policy data 129.

Likewise, as seen in FIG. 2, mapping function 200 includes row 209 indicating that for a data classification 4 indicated in data classification data 123, application and maintenance policy 4 of secrets application and maintenance policy data 124 is to be applied, and required secrets application data 127 requires the application of secrets data 101B, in accordance with the secrets maintenance program 4 of secrets maintenance policy data 129.

Likewise, as seen in FIG. 2, mapping function 200 includes row 211 indicating that for a data classification N indicated in data classification data 123, application and maintenance policy N of secrets application and maintenance policy data 124 is to be applied, and required secrets application data 127 requires the application of secrets data 100N and secrets data 101N, in accordance with the secrets maintenance program N of secrets maintenance policy data 129.

In one embodiment, the required secrets application data of the secret application and maintenance policy data for the determined class of the data to be protected is analyzed to identify the required secret types to be applied to the data to be protected.

In one embodiment, required secrets data representing one or more secrets of the required secret types indicated in the required secrets application data to be applied to the data to be protected is obtained.

As noted above, in one embodiment, the different types of secrets are provided by, and/or originate from, different secret sources. In one embodiment, the secrets data representing the different classes of secrets are maintained in separate secret databases, systems, or data stores.

In one embodiment, required secrets data representing one or more secrets of the required secret types indicated in the required secrets application data and to be applied to the data to be protected is obtained from the different secret sources.

Referring to FIG. 1, and as noted above, the secrets data is represented in FIG. 1 by secrets data 100A, required secrets data 100R, and secrets data 100N included in secrets type 1 database 100; secrets data 101A, secrets data 101B, and secrets data 101N, included in secrets type 2 database 101; and secrets data 102A, secrets data 102B, and secrets data 102N, included in secrets type 3 database 102. In one embodiment, each of secrets databases 100, 101, and 102 is a source of a different type of secrets that is part of, or accessible by, secrets manager system 120 in first computing environment 11. As seen in FIG. 1, required secrets application data 127 dictates which secrets are included in the required secrets data obtained in accordance with secret application and maintenance policy data 124.

Referring to FIG. 1 and FIG. 2, in this specific illustrative example, data classification data for the data to be protected 123 is illustratively stipulated to be data classification 2 in FIG. 2. Consequently, referring to FIG. 2, application and maintenance policy 2 is the data of secrets application and maintenance policy data 124 to be associated with data to be protected 141. Therefore, required secrets application data 127 dictates that required secrets data 128 include required secrets data 100R. In addition, as seen in FIG. 2, secrets maintenance policy data 129 includes secrets maintenance program 2 to manage the application and maintenance of required secrets data 100R.

In one embodiment, once the classification of the data to be protected is determined, which, in turn, determines the secret application and maintenance policy data to be applied to the data to be protected which, in turn, determines the required secrets application data to be applied to the data to be protected indicating the required secret types to be applied to the data to be protected, and the secrets maintenance policy data to be applied to the data to be protected indicating secret maintenance procedures for the required secrets applied to the data to be protected, the required secrets data and the application and maintenance policy data for the determined class of the data to be protected are correlated with the data to be protected and stored in a secrets store.

In various embodiments, the secrets store can be any data store or database as discussed herein, and/or as known in the art at the time of filing, and/or as developed/made available after the time of filing.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

Referring to FIG. 1, secrets maintenance policy data 129 and required secrets data 128 are correlated to data to be protected 141 and stored in secrets store 130.

In one embodiment, the one or more secrets of the required secrets data are then automatically scheduled for application to the data to be protected in accordance with the secrets maintenance policy data of the secret application and maintenance policy data for the determined class of the data to be protected.

In one embodiment, maintenance of the one or more secrets of the required secrets data obtained in accordance with the required secrets application data is then automatically scheduled in accordance with the secrets maintenance policy data of the secret application and maintenance policy data for the determined class of the data to be protected.

Referring to FIG. 1, in one embodiment, secrets maintenance policy data 129 and required secrets data 128 are provided to secrets application and maintenance control scheduling system 131, e.g., a secrets application scheduler, in one embodiment through secrets store 130. As also seen in FIG. 1, in one embodiment, secrets application and maintenance control scheduling system 131 provides input data to secrets application and maintenance control module 133 which, in turn, automatically schedules and performs the application of the one or more secrets of required secrets data 128 to data to be protected 141 in accordance with the secrets maintenance procedures indicated in secrets maintenance policy data 129 of secret application and maintenance policy data 124 for the determined class of data to be protected 141.

Numerous, means, mechanisms, processes and procedures for scheduling and applying one or more secrets to data and then maintaining those secrets in accordance with a secrets maintenance procedure are possible, and capable of being implemented by those of skill in the art. Consequently, a more detailed discussion of the specific, means, mechanisms, processes, and procedures for scheduling and applying the one or more secrets of the required secrets data obtained in accordance with the required secrets application data to the data to be protected, and maintaining the one or more secrets of the required secrets data in accordance with the secrets maintenance procedure of the secrets maintenance policy data of the secrets application and maintenance policy data associated with the determined class of data of the data to be protected, is omitted here to avoid detracting from the invention.

Using the method and system for automatically managing secrets application and maintenance discussed herein, the classification of the data to be protected is determined, which, in turn, determines the secret application and maintenance policy data to be applied to the data to be protected which, in turn, determines the required secrets application data to be applied to the data to be protected, indicating the required secret types to be applied to the data to be protected, and the secrets maintenance policy data to be applied to the data to be protected, indicating secret maintenance procedures for the required secrets applied to the data to be protected. Then the required secrets data and the application and maintenance policy data for the determined class of the data to be protected are correlated with the data to be protected and stored in a secrets store used to automatically schedule the application and maintenance of required secrets with respect to the data to be protected in accordance with the secrets maintenance policy data of the secret application and maintenance policy data for the determined class of the data to be protected.

Consequently, a method and system to manage, apply, and maintain, secrets data in accordance with one or more secrets management policies that are automatically determined based on the specific type of data to be protected, that is highly automated in application, that minimizes latencies, and that can operate in multiple environments, is provided without compromising the secrets, the resources accessed using the secrets, and/or any data or objects associated with the secrets.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for automatically managing secrets application and maintenance includes generating data classification data defining one or more classes of data. In one embodiment, secret application and maintenance policy data is then generated for each class of data including required secrets application data, indicating the required secret types to be applied to each class of data, and secrets maintenance policy data, indicating secret maintenance procedures for the required secrets applied to each class of data.

In one embodiment, access to data to be protected is obtained and the class of the data to be protected is determined. In one embodiment, the secret application and maintenance policy data for the determined class of the data to be protected is identified and obtained. In one embodiment, the required secrets application data of the secret application and maintenance policy data for the determined class of the data to be protected is analyzed to identify the required secret types to be applied to the data to be protected. In one embodiment, required secrets data representing one or more secrets of the required secret types to be applied to the data to be protected is then obtained.

In one embodiment, the one or more secrets of the required secrets data are then automatically scheduled for application to the data to be protected in accordance with the required secrets application data of the secret application and maintenance policy data for the determined class of the data to be protected.

In one embodiment, maintenance of the one or more secrets of the required secrets data is then automatically scheduled in accordance with the secrets maintenance policy data of the secret application and maintenance policy data for the determined class of the data to be protected.

Figure 3:
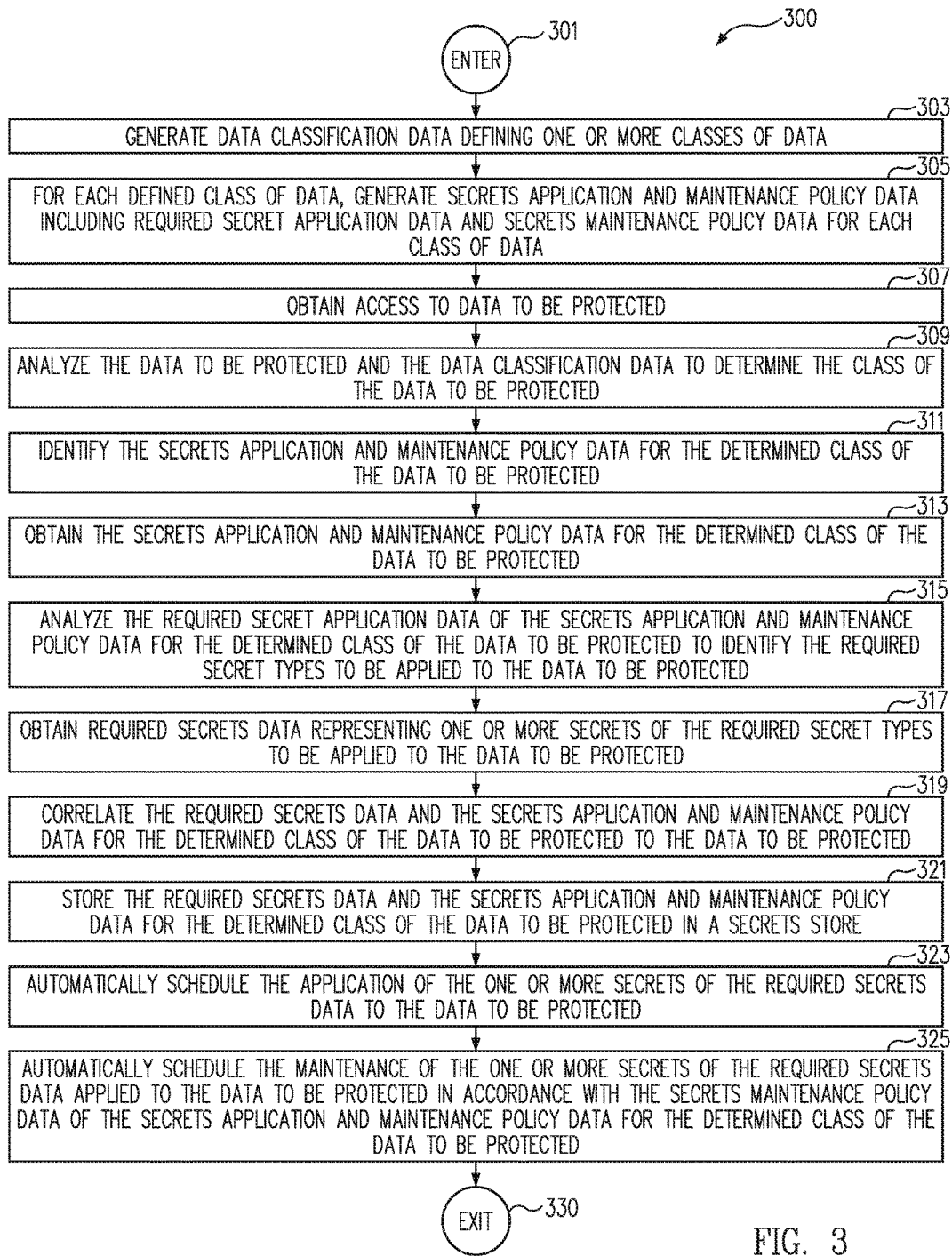
FIG. 3 is a flow chart depicting a process for automatically managing secrets application and maintenance in accordance with one embodiment.

FIG. 3 is a flow chart of a process 300 for automatically managing secrets application and maintenance in accordance with one embodiment. In one embodiment, process 300 for automatically managing secrets application and maintenance begins at ENTER OPERATION 301 of FIG. 3 and process flow proceeds to GENERATE DATA CLASSIFICATION DATA DEFINING ONE OR MORE CLASSES OF DATA OPERATION 303.

In one embodiment, at GENERATE DATA CLASSIFICATION DATA DEFINING ONE OR MORE CLASSES OF DATA OPERATION 303 data classification data defining one or more classes of data is generated.

In various embodiments, the data classification data of GENERATE DATA CLASSIFICATION DATA DEFINING ONE OR MORE CLASSES OF DATA OPERATION 303 defines one or more classes of data based on the sensitivity of the data, and/or the perceived need to protect the data.

In one embodiment, the one or more classes of data of GENERATE DATA CLASSIFICATION DATA DEFINING ONE OR MORE CLASSES OF DATA OPERATION 303 include, but are not limited to, highly sensitive data, requiring the maximum level of protection; moderately sensitive data, requiring a significant level of protection; sensitive data, requiring some level of protection; non-sensitive data, requiring a minimal level of protection; and/or any other class of data desired and defined, as discussed herein, and/or as known in the art at the time of filing, and/or as made known after the time of filing.

As discussed below, the class of data assigned to the data to be protected determines the secret application and maintenance policy data to be associated with the data to be protected. In one embodiment, the secret application and maintenance policy data associated with data to be protected, in turn, determines the types of secrets that will be used to protect the data to be protected and how the secrets used to protect the data are maintained.

In one embodiment, once data classification data defining one or more classes of data is generated at GENERATE DATA CLASSIFICATION DATA DEFINING ONE OR MORE CLASSES OF DATA OPERATION 303, process flow proceeds to FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305.

As noted above, in one embodiment, the class of data associated with data to be protected determines secret application and maintenance policy data to be associated with the data to be protected.

In one embodiment, at FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 secret application and maintenance policy data is generated for each defined class of data of GENERATE DATA CLASSIFICATION DATA DEFINING ONE OR MORE CLASSES OF DATA OPERATION 303.

As used herein, the term "secrets" includes any information, credentials, or other devices, necessary to access data, one or more resources, and/or one or more computing systems.

Specific illustrative examples of secrets include, but are not limited to, usernames; passwords; passphrases; encryption keys; digital certificates; multifactor authentication data; account numbers; identification numbers; and/or any other information, credentials, data, devices, and/or mechanisms used to control access to various systems, resources, file systems and any other persistent storage, and data, and that are required for such access, as discussed herein, and/or as known/available in the art at the time of filing, and/or as developed/made available after the time of filing.

In one embodiment, the secrets represented by the secrets data are of one or more types, or classifications, of secrets. In various embodiments, the secrets are classified according to the type of resource the secret is used to access. For example, usernames, passwords, and passphrases, necessary to access various applications would be classified as user account access secrets, while digital certificates associated with Secure Socket Layer (SSL) communications channels would be classified as communication secrets, and encryption keys would be classified as encryption secrets.

In addition, the secrets represented by the secrets data can be classified according to the level of security provided by the secrets. For instance encryption keys would be classified as secrets providing a relatively high level of security, with longer encryption keys being classified as secrets providing a higher level of security, while passwords might be classified as secrets providing a relatively moderate level of security, with longer and more diverse passwords being classified as secrets providing a relatively higher level of security.

In addition, the secrets represented by the secrets data can be classified according to whether the secrets provide access to internal resources, such as databases and data in a data center, or access to external resources such as services offered through a cloud or the Internet.

In one embodiment, the different types of secrets are provided by, and/or originate from, different secret sources. In one embodiment, the secrets data representing the different classes of secrets are maintained in separate secret databases, systems, or data stores.

As discussed in more detail below, in one embodiment, required secrets data is obtained, and/or maintained by, and/or on behalf of, a secrets manager system that is associated with a data/resources services center, such as a data center, providing data and/or resources to distributed computing systems, such as cloud-based computing environments and resources. Consequently, in one embodiment, the secrets data controlled and/or accessed by secrets manager system includes data representing one or more types of secrets used to control access to one or more types of resources associated with the types of secrets by one or more entities, such as a virtual asset, residing physically or logically outside the data/resources services center where the secrets data is maintained, and/or accessed.

In one embodiment, the class of data to be protected of GENERATE DATA CLASSIFICATION DATA DEFINING ONE OR MORE CLASSES OF DATA OPERATION 303 determines the secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 to be applied to the data to be protected which, in turn, includes required secrets application data indicating the required secret types to be applied to each class of data.

It follows, that, in one embodiment, a class of data requiring a higher level of security, such as the highly sensitive class of data, dictates secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 including required secrets application data requiring a type of secret classified as providing a relatively high level of security, such as a relatively long encryption key.

Likewise, a class of data requiring a moderate level of security, such the moderately sensitive class of data, dictates secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 including required secrets application data requiring a type of secret classified as providing a relatively moderate level of security, such as a relatively short encryption key.

Similarly, a class of data requiring a lower level of security, such the non-sensitive class of data, dictates secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 including required secrets application data requiring a type of secret classified as providing a relatively low level of security, such as a relatively short password.

Consequently, in one embodiment, at FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 each class of data is associated with specific secret application and maintenance policy data including required secrets application data that dictates what type of secrets are to be used to protect data of that class of data.

In addition, the secret application and maintenance policy data for each class of data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 includes secrets maintenance policy data indicating secret maintenance procedures for the required secrets applied to each class of data.

The timing of the application of secrets of the required secrets type, and the maintenance of the secrets of the required type, e.g., when the secrets are rotated, changed, expire, etc., is also dependent on the class of the data and the level of security required for that class of data. In one embodiment, the application of the secrets of the required secrets type, and the maintenance of the secrets of the required type, e.g., when the secrets are rotated, changed, expire, etc., is determined by the secrets maintenance policy data included in the secret application and maintenance policy data for each class of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305.

It follows, that, in one embodiment, a class of data requiring a higher level of security, such as the highly sensitive class of data, dictates secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 including secrets maintenance policy data requiring application of secrets as early in a process as possible, and relatively frequent maintenance of the secrets, e.g., frequent rotation, change out, or expiration of secrets, to provide a relatively high level of security.

Likewise, a class of data requiring a moderate level of security, such the moderately sensitive class of data, dictates secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 including secrets maintenance policy data requiring application of secrets relatively early in a process, and relatively moderate maintenance of the secrets, e.g., moderately frequent rotation, change out, or expiration of secrets, to provide a relatively moderate level of security.

Similarly, a class of data requiring a lower level of security, such the non-sensitive class of data, dictates secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 including secrets maintenance policy data requiring application of secrets reasonably early in a process, and relatively infrequent maintenance of the secrets, e.g., relatively infrequent rotation, change out, or expiration of secrets, to provide a relatively low level of security.

Consequently, as noted above, the various types of secrets used to protect data of each class of data varies according to the class of data in accordance with the required secrets application data of the secret application and maintenance policy data associated with the data class of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 and the application and maintenance of the determined required secrets of the required secrets type varies according to the class of data in accordance with the secrets maintenance policy data of the secret application and maintenance policy data associated with the data class of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305.

In various embodiments, the secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 is open-endedly defined such that the secret application and maintenance policy data, and/or required secrets application data, and/or the secrets maintenance policy data, for each class of data can be defined, added to, or otherwise modified, by the one or more parties, such as, but not limited to, the owner of a data center keeping or accessing the secrets data, the owner or provider of a cloud computing environment, the owner or a provider of a service, the owner or provider of one or more resources accessible using the secrets data, and/or any other party legitimately authorized to control the management of secrets. In this way, using process 300 for automatically managing secrets application and maintenance, secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 is open-endedly defined such that the secret application and maintenance policy data, and/or required secrets application data, and/or the secrets maintenance policy data, for each class of data can be tailored to the specific needs of the one or more parties associated with the management of the secrets.

In one embodiment, once secret application and maintenance policy data is generated for each defined class of data of GENERATE DATA CLASSIFICATION DATA DEFINING ONE OR MORE CLASSES OF DATA OPERATION 303 at FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305, process flow proceeds to OBTAIN ACCESS TO DATA TO BE PROTECTED OPERATION 307.

In one embodiment, at OBTAIN ACCESS TO DATA TO BE PROTECTED OPERATION 307 access to data to be protected is obtained.

In various embodiments, at OBTAIN ACCESS TO DATA TO BE PROTECTED OPERATION 307 the data to be protected is obtained from one of numerous data sources including, but not limited to, one or more software applications, one or more databases, one or more hardware systems, one or more software systems, one or more virtual assets, and/or any other source of data of any type as discussed herein, and/or as known in the art at the time of filing, and/or as becomes available and/or known after the time of filing.

As noted above, in one embodiment, at OBTAIN ACCESS TO DATA TO BE PROTECTED OPERATION 307 the data to be protected is obtained from a virtual asset data source.

As used herein, the term "virtual asset" includes any virtualized entity or resource, and/or actual, or "bare metal" entity. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "hard metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In one embodiment, once access to data to be protected is obtained at OBTAIN ACCESS TO DATA TO BE PROTECTED OPERATION 307, process flow proceeds to ANALYZE THE DATA TO BE PROTECTED AND THE DATA CLASSIFICATION DATA TO DETERMINE THE CLASS OF THE DATA TO BE PROTECTED OPERATION 309.

In one embodiment, at ANALYZE THE DATA TO BE PROTECTED AND THE DATA CLASSIFICATION DATA TO DETERMINE THE CLASS OF THE DATA TO BE PROTECTED OPERATION 309 the data class of the data to be protected of OBTAIN ACCESS TO DATA TO BE PROTECTED OPERATION 307 is determined.

As noted above, in one embodiment, the one or more classes of data of GENERATE DATA CLASSIFICATION DATA DEFINING ONE OR MORE CLASSES OF DATA OPERATION 303 include, but are not limited to, highly sensitive data, requiring the maximum level of protection; moderately sensitive data, requiring a significant level of protection; sensitive data, requiring some level of protection; non-sensitive data, requiring a minimal level of protection; and/or any other classes of data desired and defined, as discussed herein, and/or as known in the art at the time of filing, and/or as become known after the time of filing.

In various embodiments, the determination as to which data classification is to be applied to the data to be protected, i.e., a determination of the data class of the data to be protected, is made at ANALYZE THE DATA TO BE PROTECTED AND THE DATA CLASSIFICATION DATA TO DETERMINE THE CLASS OF THE DATA TO BE PROTECTED OPERATION 309 based, at least in part, on one or more data classification factors.

In various embodiments, the one or more data classification factors of ANALYZE THE DATA TO BE PROTECTED AND THE DATA CLASSIFICATION DATA TO DETERMINE THE CLASS OF THE DATA TO BE PROTECTED OPERATION 309 are factors indicating the relative sensitivity of the data to be protected. For instance, in one embodiment, the data classification factors include, but are not limited to, a determination as to the sensitivity of the data to be protected as determined by the owner of the data to be protected; the sensitivity of the data to be protected as determined by one or more regulations and/or regulatory agencies; the sensitivity of the data to be protected as determined based on the need to protect the identity and personal information of the owners and/or sources of the data to be protected; a determination of the risk or vulnerability associated with the data to be protected; and/or any other determinations as to the sensitivity and or vulnerability of the data to be protected as discussed herein, and/or as known in the art at the time of filing, and/or as becomes known after the time of filing.

In one embodiment, once the determination as to which data classification is to be applied to the data to be protected, i.e., a determination of the data class of the data to be protected, is made at ANALYZE THE DATA TO BE PROTECTED AND THE DATA CLASSIFICATION DATA TO DETERMINE THE CLASS OF THE DATA TO BE PROTECTED OPERATION 309, data indicating the determined class of the data to be protected is associated with the data to be protected.

In one embodiment, once the data class of the data to be protected of OBTAIN ACCESS TO DATA TO BE PROTECTED OPERATION 307 is determined at ANALYZE THE DATA TO BE PROTECTED AND THE DATA CLASSIFICATION DATA TO DETERMINE THE CLASS OF THE DATA TO BE PROTECTED OPERATION 309, process flow proceeds to IDENTIFY THE SECRET APPLICATION AND MAINTENANCE POLICY DATA FOR THE DETERMINED CLASS OF THE DATA TO BE PROTECTED OPERATION 311.

In one embodiment, at IDENTIFY THE SECRET APPLICATION AND MAINTENANCE POLICY DATA FOR THE DETERMINED CLASS OF THE DATA TO BE PROTECTED OPERATION 311 the secret application and maintenance policy data for the determined class of the data to be protected of ANALYZE THE DATA TO BE PROTECTED AND THE DATA CLASSIFICATION DATA TO DETERMINE THE CLASS OF THE DATA TO BE PROTECTED OPERATION 309 is identified and obtained.

As noted above, the various types of secrets used to protect data of each class of data varies according to the class of data in accordance with the required secrets application data of the secret application and maintenance policy data associated with the data class. Likewise, maintenance of the determined required secrets of the required secrets type varies according to the class of data in accordance with the secrets maintenance policy data of the secret application and maintenance policy data associated with the data class.

Consequently, the determined class of the data to be protected of ANALYZE THE DATA TO BE PROTECTED AND THE DATA CLASSIFICATION DATA TO DETERMINE THE CLASS OF THE DATA TO BE PROTECTED OPERATION 309 determines the secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 to be applied to the data to be protected of OBTAIN ACCESS TO DATA TO BE PROTECTED OPERATION 307 which, in turn, determines the required secrets application data to be applied to the data to be protected indicating the required secret types to be applied to the data to be protected. Likewise, the determined class of the data to be protected determines the secret application and maintenance policy data to be applied to the data to be protected which, in turn, determines the secrets maintenance policy data to be applied to the data to be protected indicating secret maintenance procedures for the required secrets applied to the data to be protected.

In one embodiment, once the secret application and maintenance policy data for the determined class of the data to be protected is identified and obtained at IDENTIFY THE SECRET APPLICATION AND MAINTENANCE POLICY DATA FOR THE DETERMINED CLASS OF THE DATA TO BE PROTECTED OPERATION 311, process flow proceeds to OBTAIN THE SECRET APPLICATION AND MAINTENANCE POLICY DATA FOR THE DETERMINED CLASS OF THE DATA TO BE PROTECTED OPERATION 313.

In one embodiment, at OBTAIN THE SECRET APPLICATION AND MAINTENANCE POLICY DATA FOR THE DETERMINED CLASS OF THE DATA TO BE PROTECTED OPERATION 313 the secret application and maintenance policy data for the determined class of the data to be protected of ANALYZE THE DATA TO BE PROTECTED AND THE DATA CLASSIFICATION DATA TO DETERMINE THE CLASS OF THE DATA TO BE PROTECTED OPERATION 309 identified at IDENTIFY THE SECRET APPLICATION AND MAINTENANCE POLICY DATA FOR THE DETERMINED CLASS OF THE DATA TO BE PROTECTED OPERATION 311 is obtained.

In one embodiment, once the secret application and maintenance policy data for the determined class of the data to be protected identified at IDENTIFY THE SECRET APPLICATION AND MAINTENANCE POLICY DATA FOR THE DETERMINED CLASS OF THE DATA TO BE PROTECTED OPERATION 311 is obtained at OBTAIN THE SECRET APPLICATION AND MAINTENANCE POLICY DATA FOR THE DETERMINED CLASS OF THE DATA TO BE PROTECTED OPERATION 313, process flow proceeds to ANALYZE THE REQUIRED SECRETS APPLICATION DATA OF THE SECRET APPLICATION AND MAINTENANCE POLICY DATA FOR THE DETERMINED CLASS OF THE DATA TO BE PROTECTED TO IDENTIFY THE REQUIRED SECRET TYPES TO BE APPLIED TO THE DATA TO BE PROTECTED OPERATION 315.

In one embodiment, at ANALYZE THE REQUIRED SECRETS APPLICATION DATA OF THE SECRET APPLICATION AND MAINTENANCE POLICY DATA FOR THE DETERMINED CLASS OF THE DATA TO BE PROTECTED TO IDENTIFY THE REQUIRED SECRET TYPES TO BE APPLIED TO THE DATA TO BE PROTECTED OPERATION 315 the required secrets application data of the secret application and maintenance policy data for the determined class of the data to be protected of OBTAIN THE SECRET APPLICATION AND MAINTENANCE POLICY DATA FOR THE DETERMINED CLASS OF THE DATA TO BE PROTECTED OPERATION 313 is analyzed to identify the required secret types to be applied to the data to be protected.

In one embodiment, once the required secrets application data of the secret application and maintenance policy data for the determined class of the data to be protected is analyzed to identify the required secret types to be applied to the data to be protected at ANALYZE THE REQUIRED SECRETS APPLICATION DATA OF THE SECRET APPLICATION AND MAINTENANCE POLICY DATA FOR THE DETERMINED CLASS OF THE DATA TO BE PROTECTED TO IDENTIFY THE REQUIRED SECRET TYPES TO BE APPLIED TO THE DATA TO BE PROTECTED OPERATION 315, process flow proceeds OBTAIN REQUIRED SECRETS DATA REPRESENTING ONE OR MORE SECRETS OF THE REQUIRED SECRET TYPES TO BE APPLIED TO THE DATA TO BE PROTECTED OPERATION 317.

In one embodiment, at OBTAIN REQUIRED SECRETS DATA REPRESENTING ONE OR MORE SECRETS OF THE REQUIRED SECRET TYPES TO BE APPLIED TO THE DATA TO BE PROTECTED OPERATION 317 required secrets data representing one or more secrets of the required secret types indicated in the required secrets application data to be applied to the data to be protected is obtained.

As noted above, in one embodiment, the different types of secrets are provided by, and/or originate from, different secret sources. In one embodiment, the secrets data representing the different classes of secrets are maintained in separate secret databases, systems, or data stores.

In one embodiment, required secrets data representing one or more secrets of the required secret types indicated in the required secrets application data to be applied to the data to be protected is obtained from the different secret sources.

In one embodiment, once required secrets data representing one or more secrets of the required secret types indicated in the required secrets application data to be applied to the data to be protected is obtained at OBTAIN REQUIRED SECRETS DATA REPRESENTING ONE OR MORE SECRETS OF THE REQUIRED SECRET TYPES TO BE APPLIED TO THE DATA TO BE PROTECTED OPERATION 317, process flow proceeds to CORRELATE THE REQUIRED SECRETS DATA AND THE SECRET APPLICATION AND MAINTENANCE POLICY DATA FOR THE DETERMINED CLASS OF THE DATA TO BE PROTECTED TO THE DATA TO BE PROTECTED OPERATION 319.

In one embodiment, at CORRELATE THE REQUIRED SECRETS DATA AND THE SECRET APPLICATION AND MAINTENANCE POLICY DATA FOR THE DETERMINED CLASS OF THE DATA TO BE PROTECTED TO THE DATA TO BE PROTECTED OPERATION 319 once the classification of the data to be protected is determined at ANALYZE THE DATA TO BE PROTECTED AND THE DATA CLASSIFICATION DATA TO DETERMINE THE CLASS OF THE DATA TO BE PROTECTED OPERATION 309, which, in turn, determines the secret application and maintenance policy data of FOR EACH DEFINED CLASS OF DATA, GENERATE SECRET APPLICATION AND MAINTENANCE POLICY DATA INCLUDING REQUIRED SECRETS APPLICATION DATA AND SECRETS MAINTENANCE POLICY DATA FOR EACH CLASS OF DATA OPERATION 305 to be applied to the data to be protected of OBTAIN ACCESS TO DATA TO BE PROTECTED OPERATION 307 which, in turn, determines the required secrets application data to be applied to the data to be protected indicating the required secret types to be applied to the data to be protected, and the secrets maintenance policy data to be applied to the data to be protected indicating secret maintenance procedures for the required secrets applied to the data to be protected, the required secrets data and the application and maintenance policy data for the determined class of the data to be protected are correlated with the data to be protected.

In one embodiment, once the required secrets data and the application and maintenance policy data for the determined class of the data to be protected are correlated with the data to be protected at CORRELATE THE REQUIRED SECRETS DATA AND THE SECRET APPLICATION AND MAINTENANCE POLICY DATA FOR THE DETERMINED CLASS OF THE DATA TO BE PROTECTED TO THE DATA TO BE PROTECTED OPERATION 319, process flow proceeds to STORE THE REQUIRED SECRETS DATA AND THE SECRET APPLICATION AND MAINTENANCE POLICY DATA FOR THE DETERMINED CLASS OF THE DATA TO BE PROTECTED IN A SECRETS STORE OPERATION 321.

In one embodiment, at STORE THE REQUIRED SECRETS DATA AND THE SECRET APPLICATION AND MAINTENANCE POLICY DATA FOR THE DETERMINED CLASS OF THE DATA TO BE PROTECTED IN A SECRETS STORE OPERATION 321 the required secrets data and the application and maintenance policy data for the determined class of the data to be protected correlated with the data to be protected at CORRELATE THE REQUIRED SECRETS DATA AND THE SECRET APPLICATION AND MAINTENANCE POLICY DATA FOR THE DETERMINED CLASS OF THE DATA TO BE PROTECTED TO THE DATA TO BE PROTECTED OPERATION 319 is stored in a secrets store.

In various embodiments, the secrets store of STORE THE REQUIRED SECRETS DATA AND THE SECRET APPLICATION AND MAINTENANCE POLICY DATA FOR THE DETERMINED CLASS OF THE DATA TO BE PROTECTED IN A SECRETS STORE OPERATION 321 is any data store or database as discussed herein, and/or as known in the art at the time of filing, and/or as developed/made available after the time of filing.

In one embodiment, once the required secrets data and the application and maintenance policy data for the determined class of the data to be protected correlated with the data to be protected is stored in a secrets store at STORE THE REQUIRED SECRETS DATA AND THE SECRET APPLICATION AND MAINTENANCE POLICY DATA FOR THE DETERMINED CLASS OF THE DATA TO BE PROTECTED IN A SECRETS STORE OPERATION 321, process flow proceeds to AUTOMATICALLY SCHEDULE THE APPLICATION OF THE ONE OR MORE SECRETS OF THE REQUIRED SECRETS DATA TO THE DATA TO BE PROTECTED OPERATION 323.

In one embodiment, at AUTOMATICALLY SCHEDULE THE APPLICATION OF THE ONE OR MORE SECRETS OF THE REQUIRED SECRETS DATA TO THE DATA TO BE PROTECTED OPERATION 323 the one or more secrets of the required secrets data of OBTAIN REQUIRED SECRETS DATA REPRESENTING ONE OR MORE SECRETS OF THE REQUIRED SECRET TYPES TO BE APPLIED TO THE DATA TO BE PROTECTED OPERATION 317 are automatically scheduled for application to the data to be protected of OBTAIN ACCESS TO DATA TO BE PROTECTED OPERATION 307 in accordance with the required secrets application data, and/or the secrets maintenance policy data, of the secret application and maintenance policy data of OBTAIN THE SECRET APPLICATION AND MAINTENANCE POLICY DATA FOR THE DETERMINED CLASS OF THE DATA TO BE PROTECTED OPERATION 313 for the determined class of the data to be protected of ANALYZE THE DATA TO BE PROTECTED AND THE DATA CLASSIFICATION DATA TO DETERMINE THE CLASS OF THE DATA TO BE PROTECTED OPERATION 309.

Numerous, means, mechanisms, processes and procedures for scheduling and applying one or more secrets to data are possible, and capable of being implemented by those of skill in the art. Consequently, a more detailed discussion of the specific, means, mechanisms, processes, and procedures for scheduling and applying the one or more secrets of the required secrets data obtained in accordance with the required secrets application data to the data to be protected in accordance with the secrets application and maintenance policy data associated with the determined class of data of the data to be protected is omitted here to avoid detracting from the invention.

In one embodiment, once the one or more secrets of the required secrets data are automatically scheduled for application to the data to be protected in accordance with the required secrets application data of the secret application and maintenance policy data for the determined class of the data to be protected at AUTOMATICALLY SCHEDULE THE APPLICATION OF THE ONE OR MORE SECRETS OF THE REQUIRED SECRETS DATA TO THE DATA TO BE PROTECTED OPERATION 323, process flow proceeds to AUTOMATICALLY SCHEDULE THE MAINTENANCE OF THE ONE OR MORE SECRETS OF THE REQUIRED SECRETS DATA APPLIED TO THE DATA TO BE PROTECTED IN ACCORDANCE WITH THE SECRETS MAINTENANCE POLICY DATA OF THE SECRET APPLICATION AND MAINTENANCE POLICY DATA FOR THE DETERMINED CLASS OF THE DATA TO BE PROTECTED OPERATION 325.

In one embodiment, at AUTOMATICALLY SCHEDULE THE MAINTENANCE OF THE ONE OR MORE SECRETS OF THE REQUIRED SECRETS DATA APPLIED TO THE DATA TO BE PROTECTED IN ACCORDANCE WITH THE SECRETS MAINTENANCE POLICY DATA OF THE SECRET APPLICATION AND MAINTENANCE POLICY DATA FOR THE DETERMINED CLASS OF THE DATA TO BE PROTECTED OPERATION 325 maintenance of the one or more secrets of the required secrets data of OBTAIN REQUIRED SECRETS DATA REPRESENTING ONE OR MORE SECRETS OF THE REQUIRED SECRET TYPES TO BE APPLIED TO THE DATA TO BE PROTECTED OPERATION 317 obtained in accordance with the required secrets application data is then automatically scheduled in accordance with the secrets maintenance policy data of the secret application and maintenance policy data of OBTAIN THE SECRET APPLICATION AND MAINTENANCE POLICY DATA FOR THE DETERMINED CLASS OF THE DATA TO BE PROTECTED OPERATION 313 for the determined class of the data to be protected of ANALYZE THE DATA TO BE PROTECTED AND THE DATA CLASSIFICATION DATA TO DETERMINE THE CLASS OF THE DATA TO BE PROTECTED OPERATION 309.

Numerous, means, mechanisms, processes and procedures for scheduling and maintaining secrets in accordance with a secrets maintenance procedure are possible, and capable of being implemented by those of skill in the art. Consequently, a more detailed discussion of the specific, means, mechanisms, processes, and procedures for scheduling and maintaining the one or more secrets of the required secrets data in accordance with the secrets maintenance procedure of the secrets maintenance policy data of the secrets application and maintenance policy data associated with the determined class of data of the data to be protected is omitted here to avoid detracting from the invention.

In one embodiment, once maintenance of the one or more secrets of the required secrets data obtained in accordance with the required secrets application data is automatically scheduled in accordance with the secrets maintenance policy data of the secret application and maintenance policy data for the determined class of the data to be protected at AUTOMATICALLY SCHEDULE THE MAINTENANCE OF THE ONE OR MORE SECRETS OF THE REQUIRED SECRETS DATA APPLIED TO THE DATA TO BE PROTECTED IN ACCORDANCE WITH THE SECRETS MAINTENANCE POLICY DATA OF THE SECRET APPLICATION AND MAINTENANCE POLICY DATA FOR THE DETERMINED CLASS OF THE DATA TO BE PROTECTED OPERATION 325, process flow proceeds to EXIT OPERATION 330.

In one embodiment, at EXIT OPERATION 330 process 300 for automatically managing secrets application and maintenance is exited to await new data.

Using process 300 for automatically managing secrets application and maintenance discussed above, the classification of the data to be protected is determined, which, in turn, determines the secret application and maintenance policy data to be applied to the data to be protected which, in turn, determines the required secrets application data to be applied to the data to be protected, indicating the required secret types to be applied to the data to be protected, and the secrets maintenance policy data to be applied to the data to be protected, indicating secret maintenance procedures for the required secrets applied to the data to be protected. Then the required secrets data and the application and maintenance policy data for the determined class of the data to be protected are correlated with the data to be protected and stored in a secrets store used to automatically schedule the application and maintenance of required secrets with respect to the data to be protected in accordance with the secrets maintenance policy data of the secret application and maintenance policy data for the determined class of the data to be protected.

Consequently, process 300 for automatically managing secrets application and maintenance provides a method and system to manage, apply, and maintain, secrets data in accordance with one or more secrets management policies that are automatically determined based on the specific type of data to be protected, that is highly automated in operation, that minimizes latencies, and that can operate in multiple environments, without compromising the secrets, the resources accessed using the secrets, and/or any data or objects associated with the secrets.

In various embodiments, the secrets automatically managed, applied and maintained are encryption keys.

Figure 4:
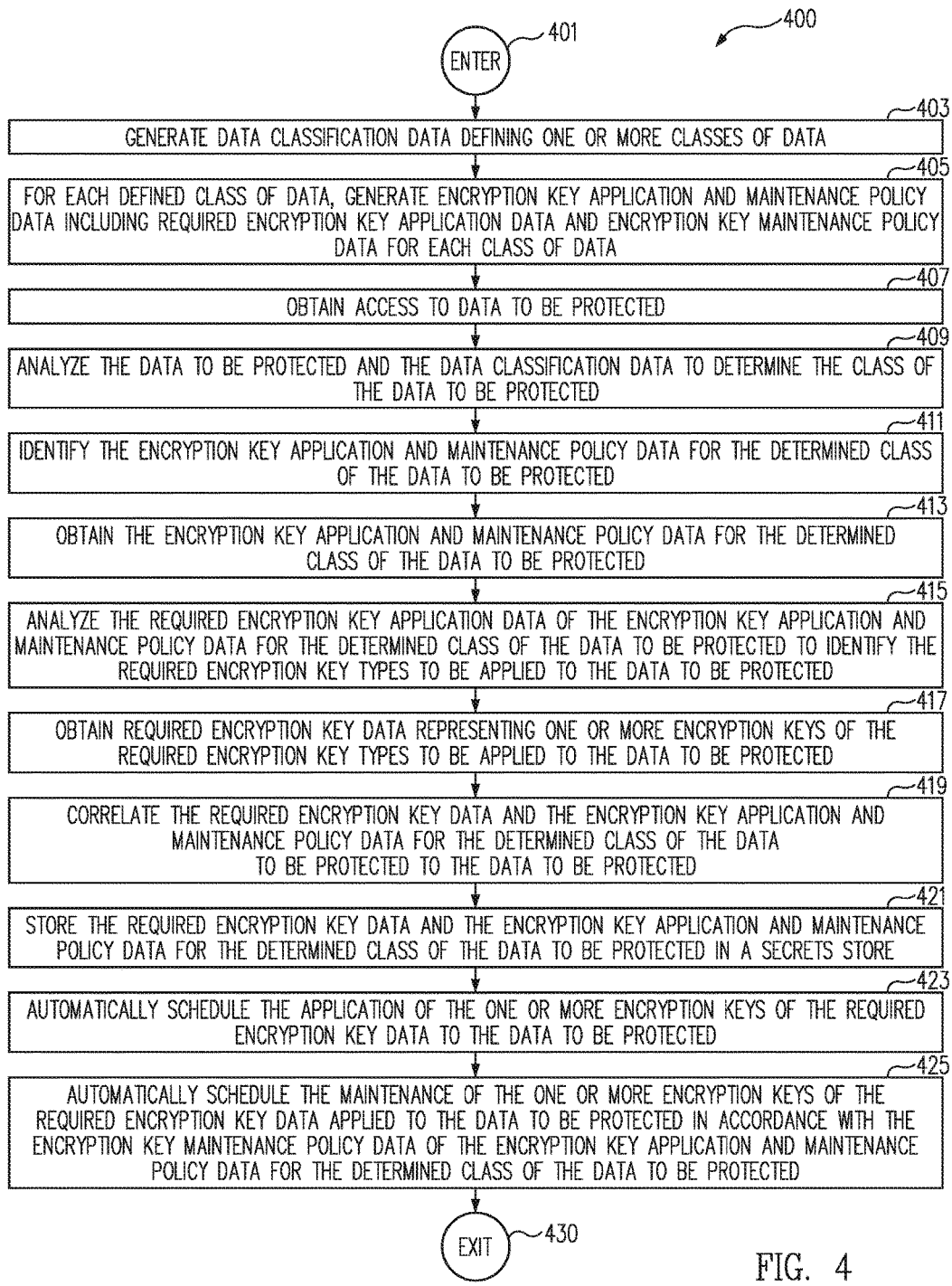
FIG. 4 is a flow chart depicting a process for automatically managing encryption key application and maintenance in accordance with one embodiment.

FIG. 4 is a flow chart of a process 400 for automatically managing encryption key application and maintenance in accordance with one embodiment. In one embodiment, process 400 for automatically managing encryption key application and maintenance begins at ENTER OPERATION 401 of FIG. 4 and process flow proceeds to GENERATE DATA CLASSIFICATION DATA DEFINING ONE OR MORE CLASSES OF DATA OPERATION 403.

In one embodiment, at GENERATE DATA CLASSIFICATION DATA DEFINING ONE OR MORE CLASSES OF DATA OPERATION 403 data classification data defining one or more classes of data is generated.

In various embodiments, the data classification data of GENERATE DATA CLASSIFICATION DATA DEFINING ONE OR MORE CLASSES OF DATA OPERATION 403 defines one or more classes of data based on the sensitivity of the data, and/or the perceived need to protect the data.

In one embodiment, the one or more classes of data of GENERATE DATA CLASSIFICATION DATA DEFINING ONE OR MORE CLASSES OF DATA OPERATION 403 include, but are not limited to, highly sensitive data, requiring the maximum level of protection; moderately sensitive data, requiring a significant level of protection; sensitive data, requiring some level of protection; non-sensitive data, requiring a minimal level of protection; and/or any other class of data desired and defined, as discussed herein, and/or as known in the art at the time of filing, and/or as made known after the time of filing.

As discussed below, the class of data assigned to the data to be protected determines the encryption key application and maintenance policy data to be associated with the data to be protected. In one embodiment, the encryption key application and maintenance policy data associated with data to be protected, in turn, determines the types of encryption keys that will be used to protect the data to be protected and how the encryption keys used to protect the data are maintained.

In one embodiment, once data classification data defining one or more classes of data is generated at GENERATE DATA CLASSIFICATION DATA DEFINING ONE OR MORE CLASSES OF DATA OPERATION 403, process flow proceeds to FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405.

As noted above, in one embodiment, the class of data associated with data to be protected determines the encryption key application and maintenance policy data to be associated with the data to be protected.

In one embodiment, at FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 encryption key application and maintenance policy data is generated for each defined class of data of GENERATE DATA CLASSIFICATION DATA DEFINING ONE OR MORE CLASSES OF DATA OPERATION 403.

Specific illustrative examples of types of encryption keys include, but are not limited to, public encryption keys; private encryption keys; symmetric encryption keys; asymmetric encryption keys; public pre-placed encryption keys; private pre-placed encryption keys; 40-bit encryption keys; any length encryption keys; authentication encryption keys; benign encryption keys; content-encryption keys (CEK); cryptovariable encryption keys; derived encryption keys; electronic encryption keys; ephemeral encryption keys; key encryption keys (KEK); key production encryption keys (KPK); FIREFLY encryption keys; master encryption keys; message encryption keys (MEK); RED encryption keys;

session encryption keys; traffic encryption keys (TEK); transmission security encryption keys (TSK); seed encryption keys; signature encryption keys; stream encryption keys; Type 1 encryption keys; Type 2 encryption keys; Vernam encryption keys; zeroized encryption keys; and/or any encryption key types, as discussed herein, and/or as known in the art at the time of filing, and/or as developed/made available after the time of filing.

In one embodiment, the encryption keys represented by the encryption keys data are of one or more types, or classifications, of encryption keys. In various embodiments, the encryption keys are classified according to the type of resource the encryption key is used to access.

In addition, the encryption keys represented by the encryption keys data can be classified according to the level of security provided by the encryption keys. For instance encryption keys of greater length or shorter life would be classified as encryption keys providing a relatively high level of security, while encryption keys of lesser length or longer life would be classified as encryption keys providing a relatively moderate level of security.

In addition, the encryption keys represented by the encryption keys data can be classified according to whether the encryption keys provide access to internal resources, such as databases and data in a data center, or access to external resources such as services offered through a cloud or the Internet.

In one embodiment, the different types of encryption keys are provided by, and/or originate from, different encryption key sources. In one embodiment, the encryption keys data representing the different classes of encryption keys are maintained in separate encryption key databases, systems, or data stores.

As discussed in more detail below, in one embodiment, required encryption keys data is obtained, and/or maintained by a secrets manager system that is associated with a data/resources services center, such as a data center, providing data and/or resources to distributed computing systems, such as cloud-based computing environments and resources. Consequently, in one embodiment, the encryption keys data controlled and/or accessed by the secrets manager system includes data representing one or more types of encryption keys used to control access to one or more types of resources associated with the types of encryption keys by one or more entities, such as a virtual asset, residing physically or logically outside the data/resources services center where the encryption keys data is maintained, and/or accessed.

In one embodiment, the class of data to be protected of GENERATE DATA CLASSIFICATION DATA DEFINING ONE OR MORE CLASSES OF DATA OPERATION 403 determines the encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 to be applied to the data to be protected which, in turn, includes required encryption keys application data indicating the required encryption key types to be applied to each class of data.

It follows, that, in one embodiment, a class of data requiring a higher level of security, such as the highly sensitive class of data, dictates encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 including required encryption keys application data requiring a type of encryption key classified as providing a relatively high level of security, such as a relatively long encryption key.

Likewise, a class of data requiring a moderate level of security, such the moderately sensitive class of data, dictates encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 including required encryption keys application data requiring a type of encryption key classified as providing a relatively moderate level of security, such as a relatively short encryption key.

Consequently, in one embodiment, at FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 each class of data is associated with specific encryption key application and maintenance policy data including required encryption keys application data that dictates what type of encryption keys are to be used to protect data of that class of data.

In addition, the encryption key application and maintenance policy data for each class of data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 includes encryption keys maintenance policy data indicating encryption key maintenance procedures for the required encryption keys applied to each class of data.

The timing of the application of encryption keys of the required encryption key type, and the maintenance of the encryption keys of the required type, e.g., when the encryption keys are rotated, changed, expire, etc., is also dependent on the class of the data and the level of security required for that class of data. In one embodiment, the application of the encryption keys of the required encryption key type, and the maintenance of the encryption keys of the required type, e.g., when the encryption keys are rotated, changed, expire, etc., is determined by the encryption keys maintenance policy data included in the encryption key application and maintenance policy data for each class of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405.

It follows, that, in one embodiment, a class of data requiring a higher level of security, such as the highly sensitive class of data, dictates encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTE- NANCE POLICY DATA FOR EACH CLASS OF DATA OPERATION 405 including encryption keys maintenance policy data requiring application of encryption keys as early in a process as possible, and relatively frequent maintenance of the encryption keys, e.g., frequent rotation, change out, or expiration of encryption keys, to provide a relatively high level of security.

Likewise, a class of data requiring a moderate level of security, such the moderately sensitive class of data, dictates encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 including encryption keys maintenance policy data requiring application of encryption keys relatively early in a process, and relatively moderate maintenance of the encryption keys, e.g., moderately frequent rotation, change out, or expiration of encryption keys, to provide a relatively moderate level of security.

Similarly, a class of data requiring a lower level of security, such the non-sensitive class of data, dictates encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 including encryption keys maintenance policy data requiring application of encryption keys reasonably early in a process, and relatively infrequent maintenance of the encryption keys, e.g., relatively infrequent rotation, change out, or expiration of encryption keys, to provide a relatively low level of security.

Consequently, as noted above, the various types of encryption keys used to protect data of each class of data varies according to the class of data in accordance with the required encryption keys application data of the encryption key application and maintenance policy data associated with the data class of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 and the application and maintenance of the determined required encryption keys of the required encryption key type varies according to the class of data in accordance with the encryption keys maintenance policy data of the encryption key application and maintenance policy data associated with the data class of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405.

In various embodiments, the encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 is open-endedly defined such that the encryption key application and maintenance policy data, and/or required encryption keys application data, and/or the encryption keys maintenance policy data, for each class of data can be defined, added to, or otherwise modified, by the one or more parties, such as, but not limited to, the owner of a data center keeping or accessing the encryption keys data, the owner or provider of a cloud computing environment, the owner or a provider of a service, the owner or provider of one or more resources accessible using the encryption keys data, and/or any other party legitimately authorized to control the management of encryption keys. In this way, using process 400 for automatically managing encryption key application and maintenance, encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 is open-endedly defined such that the encryption key application and maintenance policy data, and/or required encryption keys application data, and/or the encryption keys maintenance policy data, for each class of data can be tailored to the specific needs of the one or more parties associated with the management of the encryption keys.

In one embodiment, once encryption key application and maintenance policy data is generated for each defined class of data of GENERATE DATA CLASSIFICATION DATA DEFINING ONE OR MORE CLASSES OF DATA OPERATION 403 at FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405, process flow proceeds to OBTAIN ACCESS TO DATA TO BE PROTECTED OPERATION 407.

In one embodiment, at OBTAIN ACCESS TO DATA TO BE PROTECTED OPERATION 407 access to data to be protected is obtained.

In various embodiments, at OBTAIN ACCESS TO DATA TO BE PROTECTED OPERATION 407 the data to be protected is obtained from one of numerous data sources including, but not limited to, one or more software applications, one or more databases, one or more hardware systems, one or more software systems, one or more virtual assets, and/or any other source of data of any type as discussed herein, and/or as known in the art at the time of filing, and/or as becomes available and/or known after the time of filing.

As noted above, in one embodiment, at OBTAIN ACCESS TO DATA TO BE PROTECTED OPERATION 407 the data to be protected is obtained from a virtual asset data source, such as any virtual asset discussed herein, and/or as known/available in the art at the time of filing, and/or as developed/made available after the time of filing.

In one embodiment, once access to data to be protected is obtained at OBTAIN ACCESS TO DATA TO BE PROTECTED OPERATION 407, process flow proceeds to ANALYZE THE DATA TO BE PROTECTED AND THE DATA CLASSIFICATION DATA TO DETERMINE THE CLASS OF THE DATA TO BE PROTECTED OPERATION 409.

In one embodiment, at ANALYZE THE DATA TO BE PROTECTED AND THE DATA CLASSIFICATION DATA TO DETERMINE THE CLASS OF THE DATA TO BE PROTECTED OPERATION 409 the data class of the data to be protected of OBTAIN ACCESS TO DATA TO BE PROTECTED OPERATION 407 is determined.

As noted above, in one embodiment, the one or more classes of data of GENERATE DATA CLASSIFICATION DATA DEFINING ONE OR MORE CLASSES OF DATA OPERATION 403 include, but are not limited to, highly sensitive data, requiring the maximum level of protection; moderately sensitive data, requiring a significant level of protection; sensitive data, requiring some level of protection; non-sensitive data, requiring a minimal level of protection; and/or any other classes of data desired and defined, as discussed herein, and/or as known in the art at the time of filing, and/or as become known after the time of filing.

In various embodiments, the determination as to which data classification is to be applied to the data to be protected, i.e., a determination of the data class of the data to be protected, is made at ANALYZE THE DATA TO BE PROTECTED AND THE DATA CLASSIFICATION DATA TO DETERMINE THE CLASS OF THE DATA TO BE PROTECTED OPERATION 409 based, at least in part, on one or more data classification factors.

In various embodiments, the one or more data classification factors of ANALYZE THE DATA TO BE PROTECTED AND THE DATA CLASSIFICATION DATA TO DETERMINE THE CLASS OF THE DATA TO BE PROTECTED OPERATION 409 are factors indicating the relative sensitivity of the data to be protected. For instance, in one embodiment, the data classification factors include, but are not limited to, a determination as to the sensitivity of the data to be protected as determined by the owner of the data to be protected; the sensitivity of the data to be protected as determined by one or more regulations and/or regulatory agencies; the sensitivity of the data to be protected as determined based on the need to protect the identity and personal information of the owners and/or sources of the data to be protected; a determination of the risk or vulnerability associated with the data to be protected; and/or any other determinations as to the sensitivity and or vulnerability of the data to be protected as discussed herein, and/or as known in the art at the time of filing, and/or as becomes known after the time of filing.

In one embodiment, once the determination as to which data classification is to be applied to the data to be protected, i.e., a determination of the data class of the data to be protected, is made at ANALYZE THE DATA TO BE PROTECTED AND THE DATA CLASSIFICATION DATA TO DETERMINE THE CLASS OF THE DATA TO BE PROTECTED OPERATION 409, data indicating the determined class of the data to be protected is associated with the data to be protected.

In one embodiment, once the data class of the data to be protected of OBTAIN ACCESS TO DATA TO BE PROTECTED OPERATION 407 is determined at ANALYZE THE DATA TO BE PROTECTED AND THE DATA CLASSIFICATION DATA TO DETERMINE THE CLASS OF THE DATA TO BE PROTECTED OPERATION 409, process flow proceeds to IDENTIFY THE ENCRYPTION KEY APPLICATION AND MAINTENANCE POLICY DATA FOR THE DETERMINED CLASS OF THE DATA TO BE PROTECTED OPERATION 411.

In one embodiment, at IDENTIFY THE ENCRYPTION KEY APPLICATION AND MAINTENANCE POLICY DATA FOR THE DETERMINED CLASS OF THE DATA TO BE PROTECTED OPERATION 411 the encryption key application and maintenance policy data for the determined class of the data to be protected of ANALYZE THE DATA TO BE PROTECTED AND THE DATA CLASSIFICATION DATA TO DETERMINE THE CLASS OF THE DATA TO BE PROTECTED OPERATION 409 is identified and obtained.

As noted above, the various types of encryption keys used to protect data of each class of data varies according to the class of data in accordance with the required encryption keys application data of the encryption key application and maintenance policy data associated with the data class. Likewise, maintenance of the determined required encryption keys of the required encryption key type varies according to the class of data in accordance with the encryption keys maintenance policy data of the encryption key application and maintenance policy data associated with the data class.

Consequently, the determined class of the data to be protected of ANALYZE THE DATA TO BE PROTECTED AND THE DATA CLASSIFICATION DATA TO DETERMINE THE CLASS OF THE DATA TO BE PROTECTED OPERATION 409 determines the encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 to be applied to the data to be protected of OBTAIN ACCESS TO DATA TO BE PROTECTED OPERATION 407 which, in turn, determines the required encryption keys application data to be applied to the data to be protected indicating the required encryption key types to be applied to the data to be protected. Likewise, the determined class of the data to be protected determines the encryption key application and maintenance policy data to be applied to the data to be protected which, in turn, determines the encryption keys maintenance policy data to be applied to the data to be protected indicating encryption key maintenance procedures for the required encryption keys applied to the data to be protected.

In one embodiment, once the encryption key application and maintenance policy data for the determined class of the data to be protected is identified and obtained at IDENTIFY THE ENCRYPTION KEY APPLICATION AND MAINTENANCE POLICY DATA FOR THE DETERMINED CLASS OF THE DATA TO BE PROTECTED OPERATION 411, process flow proceeds to OBTAIN THE ENCRYPTION KEY APPLICATION AND MAINTENANCE POLICY DATA FOR THE DETERMINED CLASS OF THE DATA TO BE PROTECTED OPERATION 413.

In one embodiment, at OBTAIN THE ENCRYPTION KEY APPLICATION AND MAINTENANCE POLICY DATA FOR THE DETERMINED CLASS OF THE DATA TO BE PROTECTED OPERATION 413 the encryption key application and maintenance policy data for the determined class of the data to be protected of ANALYZE THE DATA TO BE PROTECTED AND THE DATA CLASSIFICATION DATA TO DETERMINE THE CLASS OF THE DATA TO BE PROTECTED OPERATION 409 identified at IDENTIFY THE ENCRYPTION KEY APPLICATION AND MAINTENANCE POLICY DATA FOR THE DETERMINED CLASS OF THE DATA TO BE PROTECTED OPERATION 411 is obtained.

In one embodiment, once the encryption key application and maintenance policy data for the determined class of the data to be protected identified at IDENTIFY THE ENCRYPTION KEY APPLICATION AND MAINTENANCE POLICY DATA FOR THE DETERMINED CLASS OF THE DATA TO BE PROTECTED OPERATION 411 is obtained at OBTAIN THE ENCRYPTION KEY APPLICATION AND MAINTENANCE POLICY DATA FOR THE DETERMINED CLASS OF THE DATA TO BE PROTECTED OPERATION 413, process flow proceeds to ANALYZE THE REQUIRED ENCRYPTION KEY APPLICATION DATA OF THE ENCRYPTION KEY APPLICATION AND MAINTENANCE POLICY DATA FOR THE DETERMINED CLASS OF THE DATA TO BE PROTECTED TO IDENTIFY THE REQUIRED ENCRYPTION KEY TYPES TO BE APPLIED TO THE DATA TO BE PROTECTED OPERATION 415.

In one embodiment, at ANALYZE THE REQUIRED ENCRYPTION KEY APPLICATION DATA OF THE ENCRYPTION KEY APPLICATION AND MAINTENANCE POLICY DATA FOR THE DETERMINED CLASS OF THE DATA TO BE PROTECTED TO IDENTIFY THE REQUIRED ENCRYPTION KEY TYPES TO BE APPLIED TO THE DATA TO BE PROTECTED OPERATION 415 the required encryption keys application data of the encryption key application and maintenance policy data for the determined class of the data to be protected of OBTAIN THE ENCRYPTION KEY APPLICATION AND MAINTENANCE POLICY DATA FOR THE DETERMINED CLASS OF THE DATA TO BE PROTECTED OPERATION 413 is analyzed to identify the required encryption key types to be applied to the data to be protected.

In one embodiment, once the required encryption keys application data of the encryption key application and maintenance policy data for the determined class of the data to be protected is analyzed to identify the required encryption key types to be applied to the data to be protected at ANALYZE THE REQUIRED ENCRYPTION KEY APPLICATION DATA OF THE ENCRYPTION KEY APPLICATION AND MAINTENANCE POLICY DATA FOR THE DETERMINED CLASS OF THE DATA TO BE PROTECTED TO IDENTIFY THE REQUIRED ENCRYPTION KEY TYPES TO BE APPLIED TO THE DATA TO BE PROTECTED OPERATION 415, process flow proceeds OBTAIN REQUIRED ENCRYPTION KEY DATA REPRESENTING ONE OR MORE ENCRYPTION KEYS OF THE REQUIRED ENCRYPTION KEY TYPES TO BE APPLIED TO THE DATA TO BE PROTECTED OPERATION 417.

In one embodiment, at OBTAIN REQUIRED ENCRYPTION KEY DATA REPRESENTING ONE OR MORE ENCRYPTION KEYS OF THE REQUIRED ENCRYPTION KEY TYPES TO BE APPLIED TO THE DATA TO BE PROTECTED OPERATION 417 required encryption keys data representing one or more encryption keys of the required encryption key types indicated in the required encryption keys application data to be applied to the data to be protected is obtained.

As noted above, in one embodiment, the different types of encryption keys are provided by, and/or originate from, different encryption key sources. In one embodiment, the encryption keys data representing the different classes of encryption keys are maintained in separate encryption key databases, systems, or data stores.

In one embodiment, required encryption keys data representing one or more encryption keys of the required encryption key types indicated in the required encryption keys application data to be applied to the data to be protected is obtained from the different encryption key sources.

In one embodiment, once required encryption keys data representing one or more encryption keys of the required encryption key types indicated in the required encryption keys application data to be applied to the data to be protected is obtained at OBTAIN REQUIRED ENCRYPTION KEY DATA REPRESENTING ONE OR MORE ENCRYPTION KEYS OF THE REQUIRED ENCRYPTION KEY TYPES TO BE APPLIED TO THE DATA TO BE PROTECTED OPERATION 417, process flow proceeds to CORRELATE THE REQUIRED ENCRYPTION KEY DATA AND THE ENCRYPTION KEY APPLICATION AND MAINTENANCE POLICY DATA FOR THE DETERMINED CLASS OF THE DATA TO BE PROTECTED TO THE DATA TO BE PROTECTED OPERATION 419.

In one embodiment, at CORRELATE THE REQUIRED ENCRYPTION KEY DATA AND THE ENCRYPTION KEY APPLICATION AND MAINTENANCE POLICY DATA FOR THE DETERMINED CLASS OF THE DATA TO BE PROTECTED TO THE DATA TO BE PROTECTED OPERATION 419 once the classification of the data to be protected is determined at ANALYZE THE DATA TO BE PROTECTED AND THE DATA CLASSIFICATION DATA TO DETERMINE THE CLASS OF THE DATA TO BE PROTECTED OPERATION 409, which, in turn, determines the encryption key application and maintenance policy data of FOR EACH DEFINED CLASS OF DATA, GENERATE ENCRYPTION KEY APPLICATION AND MAINTENANCE POLICY DATA INCLUDING REQUIRED ENCRYPTION KEY APPLICATION DATA AND ENCRYPTION KEY MAINTENANCE POLICY DATA FOR EACH CLASS OF DATA OPERATION 405 to be applied to the data to be protected of OBTAIN ACCESS TO DATA TO BE PROTECTED OPERATION 407 which, in turn, determines the required encryption keys application data to be applied to the data to be protected indicating the required encryption key types to be applied to the data to be protected, and the encryption keys maintenance policy data to be applied to the data to be protected indicating encryption key maintenance procedures for the required encryption keys applied to the data to be protected, the required encryption keys data and the application and maintenance policy data for the determined class of the data to be protected are correlated with the data to be protected.

In one embodiment, once the required encryption keys data and the application and maintenance policy data for the determined class of the data to be protected are correlated with the data to be protected at CORRELATE THE REQUIRED ENCRYPTION KEY DATA AND THE ENCRYPTION KEY APPLICATION AND MAINTENANCE POLICY DATA FOR THE DETERMINED CLASS OF THE DATA TO BE PROTECTED TO THE DATA TO BE PROTECTED OPERATION 419, process flow proceeds to STORE THE REQUIRED ENCRYPTION KEY DATA AND THE ENCRYPTION KEY APPLICATION AND MAINTENANCE POLICY DATA FOR THE DETERMINED CLASS OF THE DATA TO BE PROTECTED IN A SECRETS STORE OPERATION 421.

In one embodiment, at STORE THE REQUIRED ENCRYPTION KEY DATA AND THE ENCRYPTION KEY APPLICATION AND MAINTENANCE POLICY DATA FOR THE DETERMINED CLASS OF THE DATA TO BE PROTECTED IN A SECRETS STORE OPERATION 421 the required encryption keys data and the application and maintenance policy data for the determined class of the data to be protected correlated with the data to be protected at CORRELATE THE REQUIRED ENCRYPTION KEY DATA AND THE ENCRYPTION KEY APPLICATION AND MAINTENANCE POLICY DATA FOR THE DETERMINED CLASS OF THE DATA TO BE PROTECTED TO THE DATA TO BE PROTECTED OPERATION 419 is stored in a secrets store.

In various embodiments, the secrets store of STORE THE REQUIRED ENCRYPTION KEY DATA AND THE ENCRYPTION KEY APPLICATION AND MAINTENANCE POLICY DATA FOR THE DETERMINED CLASS OF THE DATA TO BE PROTECTED IN A SECRETS STORE OPERATION 421 is any data store or database as discussed herein, and/or as known in the art at the time of filing, and/or as developed/made available after the time of filing.

In one embodiment, once the required encryption keys data and the application and maintenance policy data for the determined class of the data to be protected correlated with the data to be protected is stored in a secrets store at STORE THE REQUIRED ENCRYPTION KEY DATA AND THE ENCRYPTION KEY APPLICATION AND MAINTENANCE POLICY DATA FOR THE DETERMINED CLASS OF THE DATA TO BE PROTECTED IN A SECRETS STORE OPERATION 421, process flow proceeds to AUTOMATICALLY SCHEDULE THE APPLICATION OF THE ONE OR MORE ENCRYPTION KEYS OF THE REQUIRED ENCRYPTION KEY DATA TO THE DATA TO BE PROTECTED OPERATION 423.

In one embodiment, at AUTOMATICALLY SCHEDULE THE APPLICATION OF THE ONE OR MORE ENCRYPTION KEYS OF THE REQUIRED ENCRYPTION KEY DATA TO THE DATA TO BE PROTECTED OPERATION 423 the one or more encryption keys of the required encryption keys data of OBTAIN REQUIRED ENCRYPTION KEY DATA REPRESENTING ONE OR MORE ENCRYPTION KEYS OF THE REQUIRED ENCRYPTION KEY TYPES TO BE APPLIED TO THE DATA TO BE PROTECTED OPERATION 417 are automatically scheduled for application to the data to be protected of OBTAIN ACCESS TO DATA TO BE PROTECTED OPERATION 407 in accordance with the required encryption keys application data, and/or the encryption keys maintenance policy data, of the encryption key application and maintenance policy data of OBTAIN THE ENCRYPTION KEY APPLICATION AND MAINTENANCE POLICY DATA FOR THE DETERMINED CLASS OF THE DATA TO BE PROTECTED OPERATION 413 for the determined class of the data to be protected of ANALYZE THE DATA TO BE PROTECTED AND THE DATA CLASSIFICATION DATA TO DETERMINE THE CLASS OF THE DATA TO BE PROTECTED OPERATION 409.

Numerous, means, mechanisms, processes and procedures for scheduling and applying one or more encryption keys to data are possible, and capable of being implemented by those of skill in the art. Consequently, a more detailed discussion of the specific, means, mechanisms, processes, and procedures for scheduling and applying the one or more encryption keys of the required encryption keys data obtained in accordance with the required encryption keys application data to the data to be protected in accordance with the encryption keys application and maintenance policy data associated with the determined class of data of the data to be protected is omitted here to avoid detracting from the invention.

In one embodiment, once the one or more encryption keys of the required encryption keys data are automatically scheduled for application to the data to be protected in accordance with the required encryption keys application data of the encryption key application and maintenance policy data for the determined class of the data to be protected at AUTOMATICALLY SCHEDULE THE APPLICATION OF THE ONE OR MORE ENCRYPTION KEYS OF THE REQUIRED ENCRYPTION KEY DATA TO THE DATA TO BE PROTECTED OPERATION 423, process flow proceeds to AUTOMATICALLY SCHEDULE THE MAINTENANCE OF THE ONE OR MORE ENCRYPTION KEYS OF THE REQUIRED ENCRYPTION KEY DATA APPLIED TO THE DATA TO BE PROTECTED IN ACCORDANCE WITH THE ENCRYPTION KEY MAINTENANCE POLICY DATA OF THE ENCRYPTION KEY APPLICATION AND MAINTENANCE POLICY DATA FOR THE DETERMINED CLASS OF THE DATA TO BE PROTECTED OPERATION 425.

In one embodiment, at AUTOMATICALLY SCHEDULE THE MAINTENANCE OF THE ONE OR MORE ENCRYPTION KEYS OF THE REQUIRED ENCRYPTION KEY DATA APPLIED TO THE DATA TO BE PROTECTED IN ACCORDANCE WITH THE ENCRYPTION KEY MAINTENANCE POLICY DATA OF THE ENCRYPTION KEY APPLICATION AND MAINTENANCE POLICY DATA FOR THE DETERMINED CLASS OF THE DATA TO BE PROTECTED OPERATION 425 maintenance of the one or more encryption keys of the required encryption keys data of OBTAIN REQUIRED ENCRYPTION KEY DATA REPRESENTING ONE OR MORE ENCRYPTION KEYS OF THE REQUIRED ENCRYPTION KEY TYPES TO BE APPLIED TO THE DATA TO BE PROTECTED OPERATION 417 obtained in accordance with the required encryption keys application data is then automatically scheduled in accordance with the encryption keys maintenance policy data of the encryption key application and maintenance policy data of OBTAIN THE ENCRYPTION KEY APPLICATION AND MAINTENANCE POLICY DATA FOR THE DETERMINED CLASS OF THE DATA TO BE PROTECTED OPERATION 413 for the determined class of the data to be protected of ANALYZE THE DATA TO BE PROTECTED AND THE DATA CLASSIFICATION DATA TO DETERMINE THE CLASS OF THE DATA TO BE PROTECTED OPERATION 409.

Numerous, means, mechanisms, processes and procedures for scheduling and maintaining encryption keys in accordance with an encryption keys maintenance procedure are possible, and capable of being implemented by those of skill in the art. Consequently, a more detailed discussion of the specific, means, mechanisms, processes, and procedures for scheduling and maintaining the one or more encryption keys of the required encryption keys data in accordance with the encryption keys maintenance procedure of the encryption keys maintenance policy data of the encryption keys application and maintenance policy data associated with the determined class of data of the data to be protected is omitted here to avoid detracting from the invention.

In one embodiment, once maintenance of the one or more encryption keys of the required encryption keys data obtained in accordance with the required encryption keys application data is automatically scheduled in accordance with the encryption keys maintenance policy data of the encryption key application and maintenance policy data for the determined class of the data to be protected at AUTOMATICALLY SCHEDULE THE MAINTENANCE OF THE ONE OR MORE ENCRYPTION KEYS OF THE REQUIRED ENCRYPTION KEY DATA APPLIED TO THE DATA TO BE PROTECTED IN ACCORDANCE WITH THE ENCRYPTION KEY MAINTENANCE POLICY DATA OF THE ENCRYPTION KEY APPLICATION AND MAINTENANCE POLICY DATA FOR THE DETERMINED CLASS OF THE DATA TO BE PROTECTED OPERATION 425, process flow proceeds to EXIT OPERATION 430.

In one embodiment, at EXIT OPERATION 430 process 400 for automatically managing encryption key application and maintenance is exited to await new data.

Using the process 400 for automatically managing encryption key application and maintenance discussed above, the classification of the data to be protected is determined, which, in turn, determines the encryption key application and maintenance policy data to be applied to the data to be protected which, in turn, determines the required encryption key application data to be applied to the data to be protected, indicating the required encryption key types to be applied to the data to be protected, and the encryption key maintenance policy data to be applied to the data to be protected, indicating encryption key maintenance procedures for the required encryption keys applied to the data to be protected. Then the required encryption key data and the application and maintenance policy data for the determined class of the data to be protected are correlated with the data to be protected and stored in a secrets store used to automatically schedule the application and maintenance of required encryption keys with respect to the data to be protected in accordance with the encryption key maintenance policy data of the encryption key application and maintenance policy data for the determined class of the data to be protected.

Consequently, process 400 for automatically managing encryption key application and maintenance provides a method and system to manage, apply, and maintain, encryption key data in accordance with one or more encryption key management policies that are automatically determined based on the specific type of data to be protected, that is highly automated in operation, that minimizes latencies, and that can operate in multiple environments, without compromising the encryption keys, the resources accessed using the encryption keys, and/or any data or objects associated with the encryption keys.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for automatically managing secrets application and maintenance comprising:
    at least one processor; and
    at least one memory coupled to the at least one processor, the at least one memory having stored therein instructions which when executed by any set of the at least one processors, perform a process for automatically managing secrets application and maintenance, the process for automatically managing secrets application and maintenance including:
    generating data classification data defining one or more classes of data;
    for each class of data, generating secret application and maintenance policy data including required secrets application data indicating required secret types to be applied to each class of data and secrets maintenance policy data indicating secret maintenance procedures for required secrets to be applied to each class of data;
    obtaining access to data to be protected;
    determining the class of the data to be protected;
    obtaining the secret application and maintenance policy data for the determined class of the data to be protected;
    analyzing the required secrets application data of the secret application and maintenance policy data for the determined class of the data to be protected to identify the required secret types to be applied to the data to be protected, and to also identify a class of secrets associated with the determined class of data, wherein each different class of secrets associated with different levels of protection are each stored in different data stores;
    obtaining required secrets data representing one or more secrets of the required secret types to be applied to the data to be protected, the one or more secrets of the required secrets types including at least multifactor authentication data;
    automatically scheduling the application of the one or more of the required secret types to the data to be protected in accordance with the required secrets application data of the secret application and maintenance policy data for the determined class of the data to be protected; and
    automatically scheduling the reapplication, rotation or change of the one or more secrets of the required secrets data in accordance with the secrets maintenance policy data of the secret application and maintenance policy data for the determined class of the data to be protected, wherein each different secret type is governed by a different secrets maintenance policy data, and a period of rotation, change, or expiration of secrets of a given type depends on a level of security associated with the secret application and maintenance policy.

2. The system for automatically managing secrets application and maintenance of claim 1 wherein the one or more classes of data include at least one class of data selected from the group of classes of data consisting of:
    highly sensitive data, requiring the maximum level of protection;
    moderately sensitive data, requiring a significant level of protection;
    sensitive data, requiring some level of protection; and
    non-sensitive data, requiring a minimal level of protection.

3. The system for automatically managing secrets application and maintenance of claim 1 wherein at least one of the required secret types of the required secrets application data is selected from the group of secret types consisting of:
    usernames;
    passwords;
    passphrases;
    encryption keys;
    digital certificates;
    biometric data;
    account numbers;
    identification numbers; and
    any combination thereof.

4. The system for automatically managing secrets application and maintenance of claim 1 wherein the secrets maintenance policy data includes data indicating a rotation period associated with one or more of the required secret types of the required secrets application data.

5. The system for automatically managing secrets application and maintenance of claim 1 wherein the secrets maintenance policy data includes data indicating a use period associated with one or more of the required secret types of the required secrets application data.

6. The system for automatically managing secrets application and maintenance of claim 1 wherein the secrets maintenance policy data includes data indicating a retirement procedure associated with one or more of the required secret types of the required secrets application data.

7. The system for automatically managing secrets application and maintenance of claim 1 wherein the class of the data to be protected is determined based, at least in part, on at least one data classification factor selected from the group of data classification factors consisting of:
    a determination as to the sensitivity of the data to be protected as determined by the owner of the data to be protected;
    the sensitivity of the data to be protected as determined by one or more regulations and/or regulatory agencies;
    the sensitivity of the data to be protected as determined based on the need to protect the identity and personal information of the owners and/or sources of the data to be protected;

a determination of the risk associated with the data to be protected;

a determination of the vulnerability associated with the data to be protected;

the commercial value of the data;

the strategic value of the data;

the entertainment value of the data; and any combination thereof.

8. The system for automatically managing secrets application and maintenance of claim 7 wherein the secrets store includes required secrets data and the secret application and maintenance policy data for the determined class of data to be protected for two or more classes of data to be protected.

9. The system for automatically managing secrets application and maintenance of claim 1 further comprising correlating the required secrets data and the secret application and maintenance policy data for the determined class of the data to be protected to the data to be protected and storing the required secrets data and the secret application and maintenance policy data for the determined class of the data to be protected in a secrets store location associated with the data to be protected.

10. The system for automatically managing secrets application and maintenance of claim 1 further comprising providing an application scheduler for scheduling the application of the one or more secrets of the required secret types to the data to be protected in accordance with the required secrets application data of the secret application and maintenance policy data for the determined class of the data to be protected.

11. The system for automatically managing secrets application and maintenance of claim 1 further comprising providing a maintenance scheduler for scheduling the maintenance of the one or more secrets of the required secrets data in accordance with the secrets maintenance policy data of the secret application and maintenance policy data for the determined class of the data to be protected.

12. The system for automatically managing secrets application and maintenance of claim 1 wherein the data to be protected is associated with an asset in a first computing environment and the system for automatically managing secrets application and maintenance is associated with a second computing environment.

13. The system for automatically managing secrets application and maintenance of claim 1 wherein the data to be protected is associated with a virtual asset instantiated in a cloud computing environment.

14. The system for automatically managing secrets application and maintenance of claim 13 wherein the system for automatically managing secrets application and maintenance is implemented, at least in part, in a computing environment outside the cloud computing environment.

15. The system for automatically managing secrets application and maintenance of claim 13 wherein the system for automatically managing secrets application and maintenance is implemented, at least in part, by a second virtual asset instantiated in the cloud computing environment.

16. A system for automatically managing encryption key application and maintenance comprising:

at least one processor; and at least one memory coupled to the at least one processor, the at least one memory having stored therein instructions which when executed by any set of the one or more processors, perform a process for automatically managing encryption key application and maintenance, the process for automatically managing encryption key application and maintenance including:

generating data classification data defining one or more classes of data;

for each class of data, generating encryption key application and maintenance policy data including required encryption key application data indicating the required encryption key to be applied to each class of data and encryption key maintenance policy data indicating encryption key maintenance procedures for the required encryption key to be applied to each class of data;

obtaining access to data to be protected;

determining the class of the data to be protected;

obtaining the encryption key application and maintenance policy data for the determined class of the data to be protected;

analyzing the required encryption key application data of the encryption key application and maintenance policy data for the determined class of the data to be protected to identify the required encryption key type to be applied to the data to be protected, and to also identify a class of encryption key associated with the determined class of data, wherein each different class of encryption key associated with different levels of protection are each stored in different data stores;

obtaining required encryption key data representing an encryption key of the required encryption key type to be applied to the data to be protected;

automatically scheduling the application of the encryption key of the required encryption key type to the data to be protected in accordance with the required encryption key application data of the encryption key application and maintenance policy data for the determined class of the data to be protected; and automatically scheduling the reapplication, rotation or change of the encryption key of the required encryption key data in accordance with the encryption key maintenance policy data of the encryption key application and maintenance policy data for the determined class of the data to be protected, wherein each different secret type is governed by a different secrets maintenance policy data, and a period of rotation, change, or expiration of secrets of a given type depends on a level of security associated with the secret application and maintenance policy.

17. The system for automatically managing encryption key application and maintenance of claim 16 wherein the one or more classes of data include at least one class of data selected from the group of classes of data consisting of:

highly sensitive data, requiring the maximum level of protection;

moderately sensitive data, requiring a significant level of protection;

sensitive data, requiring some level of protection; and non-sensitive data, requiring a minimal level of protection.

18. The system for automatically managing encryption key application and maintenance of claim 16 wherein at least one of the required encryption key types of the required encryption key application data is selected from the group of encryption key types consisting of:

a public encryption key;

a private encryption key;

a symmetric encryption key;

an asymmetric encryption key;

a public pre-placed encryption key;

a private pre-placed encryption key;

a 40-bit encryption key;

any length encryption keys;
an authentication encryption key;
a benign encryption key;
a content-encryption key (CEK);
a cryptovariable encryption key;
a derived encryption key;
an electronic encryption key;
an ephemeral encryption key;
a key encryption key (KEK);
a key production encryption key (KPK);
a FIREFLY encryption key;
a master encryption key;
a message encryption key (MEK);
a RED encryption key;
a session encryption key;
a traffic encryption key (TEK);
a transmission security encryption key (TSK);
a seed encryption key;
a signature encryption key;
a stream encryption key;
a Type 1 encryption key;
a Type 2 encryption key;
a Vernam encryption key;
a zeroized encryption key; and
any combination thereof.

19. The system for automatically managing encryption key application and maintenance of claim 16 wherein the encryption key maintenance policy data includes data indicating a rotation period associated with encryption key type of the required encryption key application data.

20. The system for automatically managing encryption key application and maintenance of claim 16 wherein the encryption key maintenance policy data includes data indicating a retirement procedure associated with the required encryption key type of the required encryption key application data.

21. The system for automatically managing encryption key application and maintenance of claim 16 wherein the class of the data to be protected is determined based, at least in part, on at least one data classification factor selected from the group of data classification factors consisting of:
   a determination as to the sensitivity of the data to be protected as determined by the owner of the data to be protected;
   the sensitivity of the data to be protected as determined by one or more regulations and/or regulatory agencies;
   the sensitivity of the data to be protected as determined based on the need to protect the identity and personal information of the owners and/or sources of the data to be protected;
   a determination of the risk associated with the data to be protected;
   a determination of the vulnerability associated with the data to be protected;
   a determination of the vulnerability associated with the data to be protected;
   the commercial value of the data;
   the strategic value of the data;
   the entertainment value of the data;
   any combination thereof; and
   any combination thereof.

22. The system for automatically managing encryption key application and maintenance of claim 16 further comprising correlating the required encryption key data and the encryption key application and maintenance policy data for the determined class of the data to be protected to the data to be protected and storing the required encryption key data and the encryption key application and maintenance policy data for the determined class of the data to be protected in an encryption key store location associated with the data to be protected.

23. The system for automatically managing encryption key application and maintenance of claim 22 wherein the encryption key store includes required encryption key data and the encryption key application and maintenance policy data for the determined class of data to be protected for two or more classes of data to be protected.

24. The system for automatically managing encryption key application and maintenance of claim 16 further comprising providing an application scheduler for scheduling the application of the encryption key of the required encryption key type to the data to be protected in accordance with the required encryption key application data of the encryption key application and maintenance policy data for the determined class of the data to be protected.

25. The system for automatically managing encryption key application and maintenance of claim 16 further comprising providing a maintenance scheduler for scheduling the maintenance of the encryption key of the required encryption key data in accordance with the encryption key maintenance policy data of the encryption key application and maintenance policy data for the determined class of the data to be protected.

26. The system for automatically managing encryption key application and maintenance of claim 16 wherein the data to be protected is associated with an asset in a first computing environment and the system for automatically managing encryption key application and maintenance is associated with a second computing environment.

27. The system for automatically managing encryption key application and maintenance of claim 16 wherein the data to be protected is associated with a virtual asset instantiated in a cloud computing environment.

28. The system for automatically managing encryption key application and maintenance of claim 27 wherein the system for automatically managing encryption key application and maintenance is implemented, at least in part, in a computing environment outside the cloud computing environment.

29. The system for automatically managing encryption key application and maintenance of claim 27 wherein the system for automatically managing encryption key application and maintenance is implemented, at least in part, by a second virtual asset instantiated in the cloud computing environment.

30. A computing system implemented method for automatically managing secrets application and maintenance comprising the following, which when executed individually or collectively by any set of one or more processors perform a process including:
   generating data classification data defining one or more classes of data;
   for each class of data, generating secret application and maintenance policy data including required secrets application data indicating the required secret types to be applied to each class of data and secrets maintenance policy data indicating secret maintenance procedures for the required secrets to be applied to each class of data;
   obtaining access to data to be protected;
   determining the class of the data to be protected;
   obtaining the secret application and maintenance policy data for the determined class of the data to be protected;

analyzing the required secrets application data of the secret application and maintenance policy data for the determined class of the data to be protected to identify the required secret types to be applied to the data to be protected, the required secret types including at least multifactor authentication data, and to also identify a class of secrets associated with the determined class of data, wherein each different class of secrets associated with different levels of protection are each stored in different data stores;

obtaining required secrets data representing one or more secrets of the required secret types to be applied to the data to be protected;

automatically scheduling the application of the one or more secrets of the required secret types to the data to be protected in accordance with the required secrets application data of the secret application and maintenance policy data for the determined class of the data to be protected; and automatically scheduling the reapplication, rotation or change of the one or more secrets of the required secrets data in accordance with the secrets maintenance policy data of the secret application and maintenance policy data for the determined class of the data to be protected, wherein each different secret type is governed by a different secrets maintenance policy data, and a period of rotation, change, or expiration of secrets of a given type depends on a level of security associated with the secret application and maintenance policy.

31. The computing system implemented method for automatically managing secrets application and maintenance of claim 30 wherein the one or more classes of data include at least one class of data selected from the group of classes of data consisting of:
  highly sensitive data, requiring the maximum level of protection;
  moderately sensitive data, requiring a significant level of protection;
  sensitive data, requiring some level of protection; and
  non-sensitive data, requiring a minimal level of protection.

32. The computing system implemented method for automatically managing secrets application and maintenance of claim 30 wherein at least one of the required secret types of the required secrets application data is selected from the group of secret types consisting of:
  usernames;
  passwords;
  passphrases;
  encryption keys;
  digital certificates;
  biometric data;
  account numbers;
  identification numbers; and
  any combination thereof.

33. The computing system implemented method for automatically managing secrets application and maintenance of claim 30 wherein the secrets maintenance policy data includes data indicating a rotation period associated with one or more of the required secret types of the required secrets application data.

34. The computing system implemented method for automatically managing secrets application and maintenance of claim 30 wherein the secrets maintenance policy data includes data indicating a use period associated with one or more of the required secret types of the required secrets application data.

35. The computing system implemented method for automatically managing secrets application and maintenance of claim 30 wherein the secrets maintenance policy data includes data indicating a retirement procedure associated with one or more of the required secret types of the required secrets application data.

36. The computing system implemented method for automatically managing secrets application and maintenance of claim 30 wherein the class of the data to be protected is determined based, at least in part, on at least one data classification factor selected from the group of data classification factors consisting of:
  a determination as to the sensitivity of the data to be protected as determined by the owner of the data to be protected;
  the sensitivity of the data to be protected as determined by one or more regulations and/or regulatory agencies;
  the sensitivity of the data to be protected as determined based on the need to protect the identity and personal information of the owners and/or sources of the data to be protected;
  a determination of the risk associated with the data to be protected;
  a determination of the vulnerability associated with the data to be protected;
  the commercial value of the data;
  the strategic value of the data;
  the entertainment value of the data; and
  any combination thereof.

37. The computing system implemented method for automatically managing secrets application and maintenance of claim 30 further comprising correlating the required secrets data and the secret application and maintenance policy data for the determined class of the data to be protected to the data to be protected and storing the required secrets data and the secret application and maintenance policy data for the determined class of the data to be protected in a secrets store location associated with the data to be protected.

38. The computing system implemented method for automatically managing secrets application and maintenance of claim 30 wherein the data to be protected is associated with an asset in a first computing environment and a computing system implementing at least part of the method for automatically managing secrets application and maintenance is associated with a second computing environment.

* * * * *